United States Patent
Duchemin et al.

(10) Patent No.: US 8,240,456 B2
(45) Date of Patent: Aug. 14, 2012

(54) METHOD OF REGULATING A FLOW OF PRODUCTS AND LAYOUT FOR THE IMPLEMENTATION OF SUCH A METHOD

(75) Inventors: Guillaume Duchemin, Octeville sur Mer (FR); Christophe Poupon, Octeville (FR)

(73) Assignee: Sidel Participations, Octeville-sur-Mer (FR)

( * ) Notice: Subject to any disclaimer, the term of this patent is extended or adjusted under 35 U.S.C. 154(b) by 551 days.

(21) Appl. No.: 12/438,589

(22) PCT Filed: Aug. 14, 2007

(86) PCT No.: PCT/EP2007/058401
§ 371 (c)(1),
(2), (4) Date: Feb. 24, 2009

(87) PCT Pub. No.: WO2008/022943
PCT Pub. Date: Feb. 28, 2008

(65) Prior Publication Data
US 2009/0191044 A1     Jul. 30, 2009

(30) Foreign Application Priority Data
Aug. 24, 2006 (FR) ...................................... 06 53448

(51) Int. Cl.
*B65G 47/31* (2006.01)
(52) U.S. Cl. ..................... 198/443; 198/434; 198/460.1; 198/575; 198/577

(58) Field of Classification Search .................. 198/434, 198/460.1, 375
See application file for complete search history.

(56) References Cited

U.S. PATENT DOCUMENTS

| | | | |
|---|---|---|---|
| 3,970,189 A | | 7/1976 | Steinhart et al. |
| 4,360,098 A | * | 11/1982 | Nordstrom ................. 198/418.1 |
| 4,753,668 A | * | 6/1988 | Honjo et al. ................. 65/29.16 |
| 4,892,181 A | | 1/1990 | Hogenkamp |
| 5,022,511 A | * | 6/1991 | Gorrieri et al. ............. 198/460.1 |

FOREIGN PATENT DOCUMENTS
EP         0 613 838         9/1994

OTHER PUBLICATIONS

International Search Report dated Dec. 13, 2007, from correspond PCT application.

\* cited by examiner

*Primary Examiner* — Kavel Singh
(74) *Attorney, Agent, or Firm* — Young & Thompson

(57) ABSTRACT

A regulation method for ordering a flow of two lines of products includes at least: —a first step of slowing when the spacing value between a first product pertaining to one of the lines and a second product, situated immediately upstream and pertaining to another of the lines is less than a first set value; and—a second step of slowing when the value of the spacing between a downstream product of the first line and the proximal product situated immediately upstream on the second line is lower than a second set value, the first step of slowing and second step of slowing being respectively implemented selectively so as to place in phase the spacings between the products of the first and second lines according to a sequence determined as a function of the device for transferring to cavities.

6 Claims, 7 Drawing Sheets

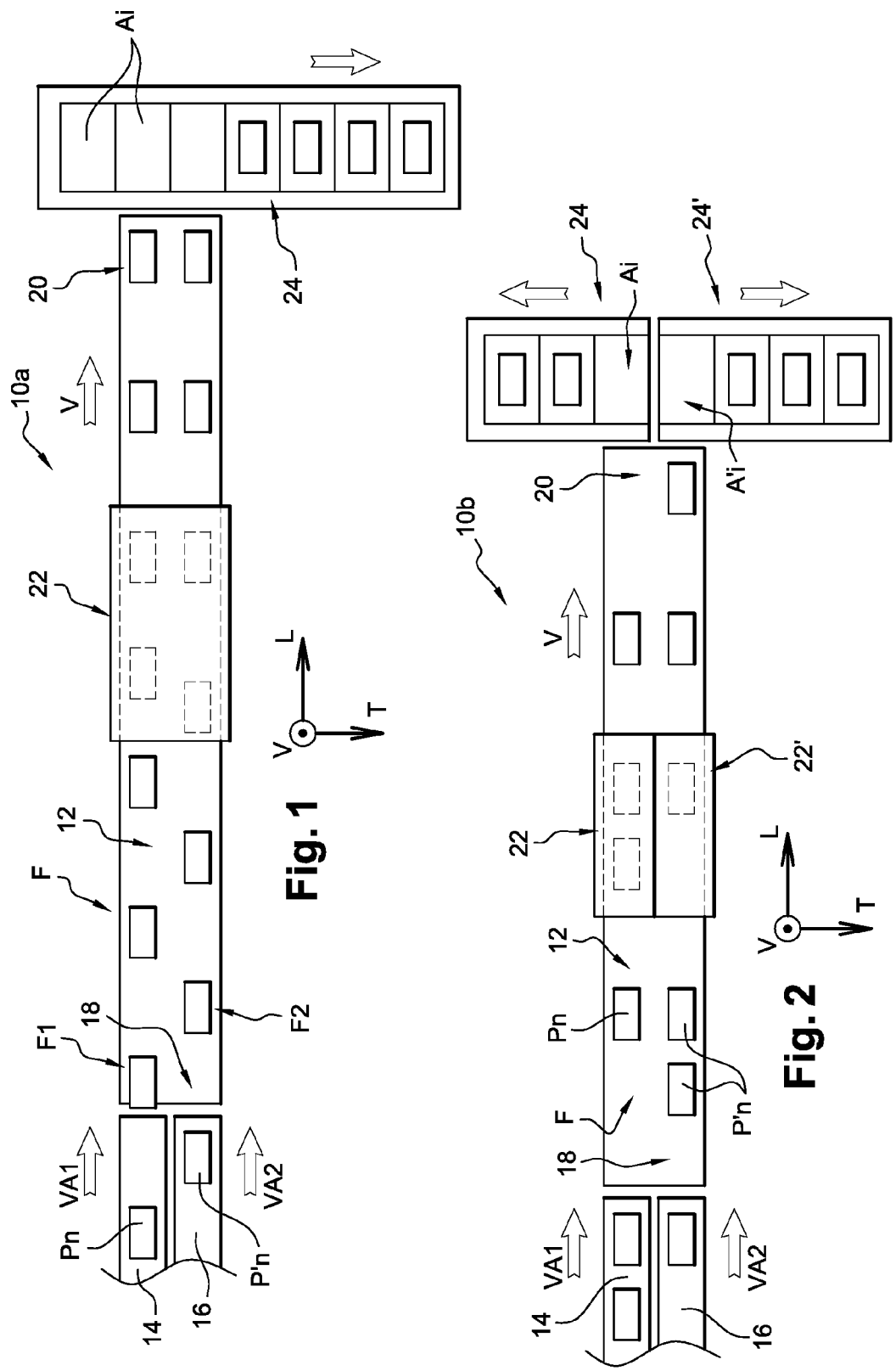

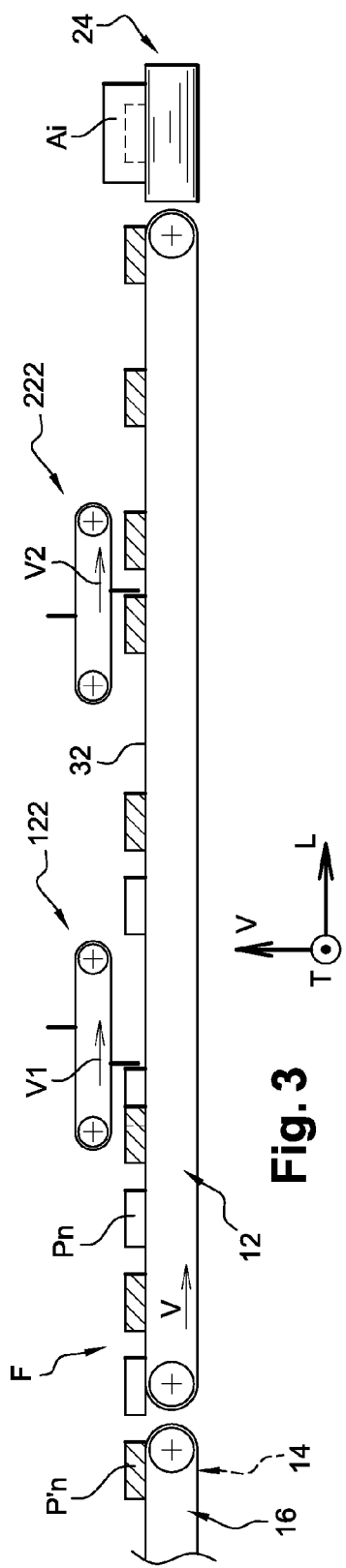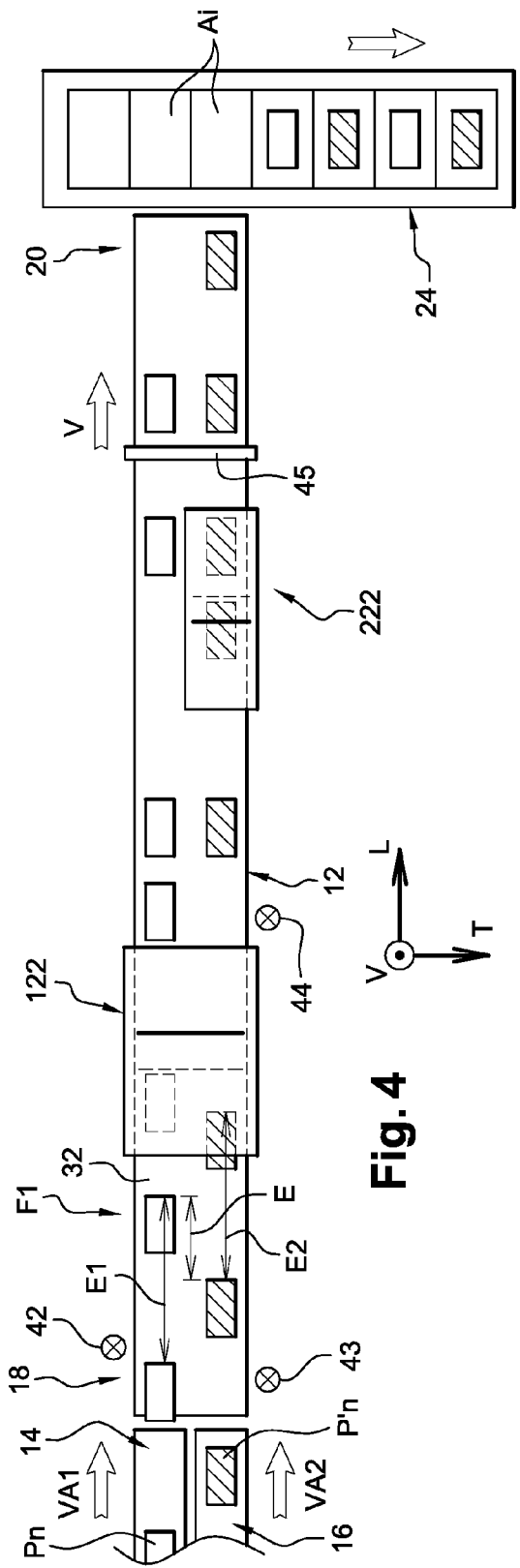

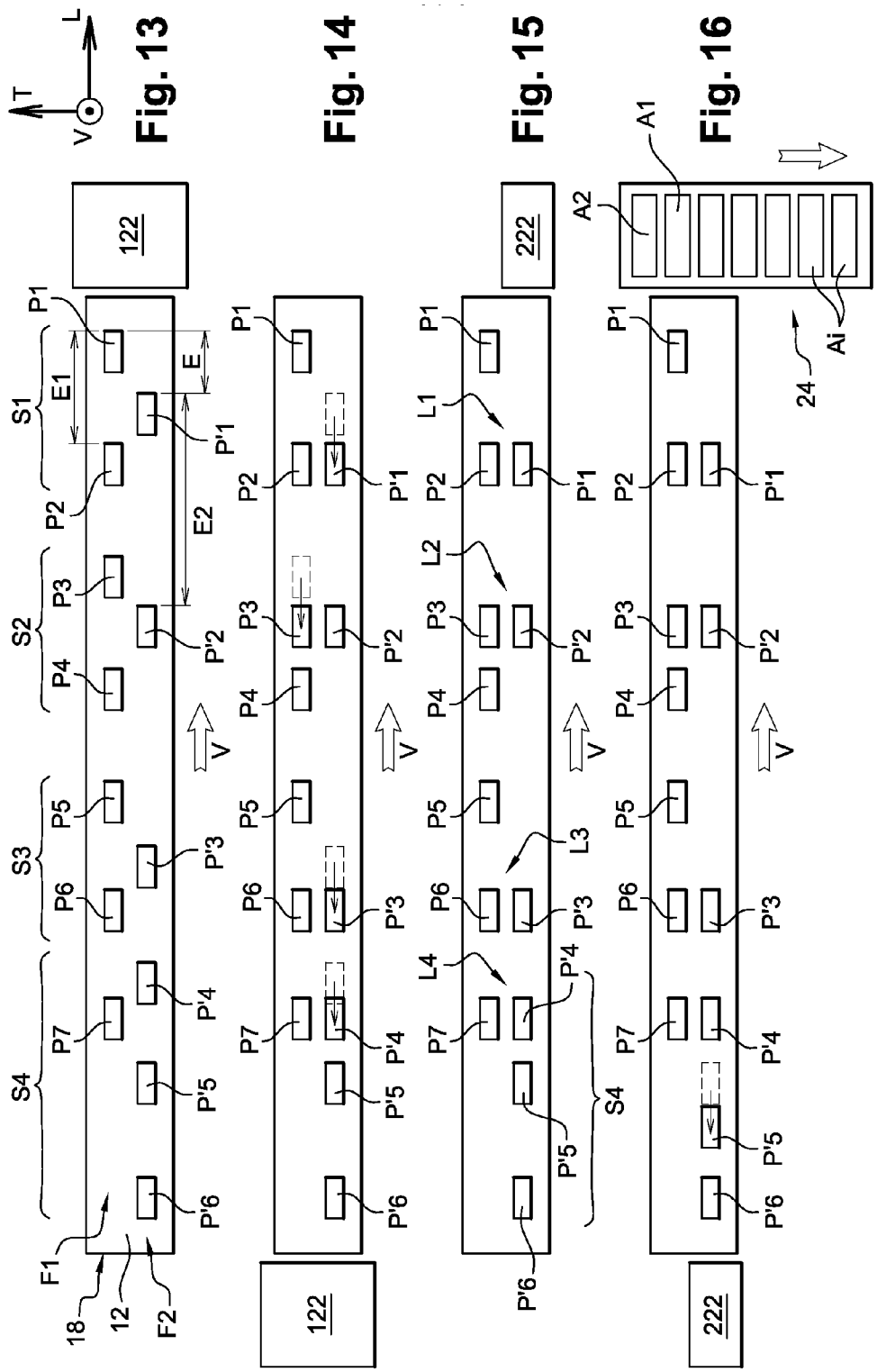

METHOD OF REGULATING A FLOW OF PRODUCTS AND LAYOUT FOR THE IMPLEMENTATION OF SUCH A METHOD

The invention relates to a regulation method for regulating a flow of products and a layout for the implementation of such a method.

The invention relates more specifically to a regulation method for aligning a flow of products comprising at least a first line of products and a second line of products, parallel to the first line, which are transported longitudinally on a conveyor belt at a running speed from an upstream arrival area to a downstream output area in order to feed a transfer device for transfer into cells, called the collector, so as to bring the spaces between the products into phase according to a sequence determined according to the transfer device.

The invention also relates to a layout, in particular for implementing such a regulation method, of the type comprising a flow of products consisting of at least a first line of products and a second line of products, parallel to the first line, which are transported longitudinally on a conveyor belt at a running speed from an upstream arrival area to a downstream output area, in which the flow of products is intended to feed a transfer device for transfer into cells, called the collector, arranged downstream of the output area of the conveyor belt so as to present, opposite each of said first and second lines respectively, an associated empty cell intended to contain at least one product.

Many methods are known for regulating a flow of products and layouts in which such regulation methods are capable of being implemented.

This type of method and layout are used in particular in installations for product packaging, for example in installations comprising a conveyor line that routes the products through to a case-packing machine, the case-packing machine piling up products, generally batches of products, in packing cases or cartons.

The conveyor line generally comprises, upstream of the case-packing machine, a conveyor belt that transports the products on one or more lines, with a determined spacing between two consecutive products, through to a transfer device, for example a collector comprising a series of mobile transport cells.

The collector, sometimes also called the load separator, presents opposite each of the lines of the belt at least one associated empty cell, provided in order to receive a product or a batch of products.

FIGS. 1 and 2 show a first and a second example layout 10a and 10b according to the prior art.

In a known manner, the layout 10a, 10b comprises a conveyor belt 12 intended to transport a flow F of products Pn, P'n consisting of at least a first line F1 of products Pn and a second line F2 of products P'n which is parallel to the first line F1.

The flow of products Pn, P'n is routed by an upstream feeder device comprising a first feeder belt 14 and a second feeder belt 16 through to an upstream arrival area 18 of the conveyor belt 12.

Upstream of the belt 12, the products Pn from the first line F1 are transported by the first feeder belt 14, while the products P'n are transported by the second feeder belt 16, such that the products Pn from the first line F1 and the products P'n from the second line F2 arrive in the arrival area 18 with a feeder speed VA1 and a feeder speed VA2 respectively.

The conveyor belt 12 then longitudinally transports the products Pn and P'n, at a determined running speed V, from the upstream arrival area 18 to a downstream output area 20, between which regulation means 22 are positioned so as to feed at least one transfer device 24, hereafter the collector, comprising a series of cells Ai.

The cells Ai of the collector 24 thus move progressively to allow, for example, the products to be routed through to a case-packing machine (not shown) and determine a maximum processing rate beyond which the collector 24 is no longer able to collect the products coming from the belt 12.

Thus, by considering the collector 24 shown in FIG. 1 it will be understood that simultaneously filling two cells associated with two parallel lines of products allows the capacity of the number of products processed per unit time to be doubled in comparison with filling of a single cell.

However, in order to guarantee the proper operation of such a transfer device 24, it is necessary that the longitudinal spacing between the successive products is sufficient to allow the collector 24 simultaneously to move by at least two notches, i.e. to shift two cells Ai, Ai+1 transversely downward after being filled so as once again to present two empty cells opposite the first and second lines of products from the belt 12.

This is the reason for which it is known to position regulation means 22 for regulating products, also generally called a "phaser", upstream of the collector 24.

Such regulation means 22 are, for example, capable of constituting batches of two products Pn, P'n with a spacing or gap between each batch Li of products allowing the collector 24 to have a time lapse T necessary to shift two cells between two successive batches of products running at the speed V on the belt 12.

The regulation means 22 according to the prior art consist, for example, of a phaser provided with a suction device that is arranged between the arrival 18 and output 20 areas of the belt 12 so as to immobilize the products from the first and second lines F1 and F2 temporarily in order to ensure a spacing between each batch of two products Pn, P'n that is sufficient to allow the collector 24 to move by two cells Ai, Ai+1.

The layout 10a shown in FIG. 1 illustrates a first example of an application in which the feeder speed VA1 of the first feeder belt 14 comprising the products Pn forming the first line F1 is approximately equal to the feeder speed VA2 of the second belt 16 comprising the products P'n forming the second line F2.

For such an application the least favorable sequence of distribution of the products Pn and P'n of each line F1, F2 corresponds to a phase opposition between the products Pn, P'n from each of the lines F1, F2.

Such a sequence, corresponding to an arrangement of products Pn from the first line F1 in staggered rows in relation to the products P'n from the second line F2, at the rate here of one product to two, is shown in the section of the belt 12 lying upstream of the phaser 22.

It will be understood that as soon as there is such a phase difference between the products Pn from the first line F1 and the products P'n from the second line F2, the collector 24 does not have the time lapse T necessary to shift the cells Ai successively before the arrival of the next product.

This is the reason for which the products Pn, P'n are temporarily stopped by the phaser 22 upstream of the collector 24.

Although such a phaser 22 with a suction device is likely to be satisfactory for some applications, it nonetheless has drawbacks.

Specifically, this type of phaser does not allow, on the one hand, products to be processed at a very high rate, for example at rates higher than 900 products per minute, nor, on the other hand, certain types of product to be processed, in particular those not offering a suitable contact surface, which especially limits the field of application.

FIG. 2 shows a second example layout 10b which will be described hereafter by comparison with that of FIG. 1.

This second example corresponds to the case of an application in which the feeder speed VA1 of the first feeder belt 14 comprising the products Pn forming the first line F1 is different from the feeder speed VA2 of the second belt 16 comprising the products P'n forming the second line F2.

Such an application corresponds to the case of a packaging installation in which the feeding of products Pn, P'n of the belt 12 comes, upstream, from two distinct sources, each comprising their own feeder belt 14, 16 whose operation is independent.

In such an application it is not possible to use a phaser 22 comprising a suction device of the previously described type so as to feed a collector 24 operating with a simultaneous shifting of two cells, each being associated with one of the two lines F1, F2.

This is because the position of the products Pn from the first line F1 and of the products P'n from the second line F2 on the belt are then subjected to random phenomena and the spacings between the products are variable, as much within the same line as from one line to the other.

As the sequence of products in FIG. 2 illustrates, it is, in particular, possible that a single product or two products present themselves in order to fill the cells Ai with a distance, called "spacing", that is respectively too short to allow reliable and optimum operation of the collector 24 to be obtained.

This is the reason for which, for such an application, one solution consists in associating one collector 24, 24' with each of the first and second lines F1, F2 which are each processed by means of a phaser 22, 22' in order to align the products Pn or P'n with a given spacing corresponding to the minimum time lapse T necessary for the collector 24, 24' to shift by one cell, notch by notch.

Consequently, such a solution is expensive, especially due to the doubling of transfer means and moreover it is not satisfactory due to the impossibility of attaining product processing at a high rate.

The invention aims in particular to eliminate these drawbacks by proposing a simple, economic and effective solution which also enables high rates to be attained.

To this end, the invention proposes a regulation method of the type described above, characterized in that it comprises at least:
  a first slowing-down step which, when the spacing value between a given first product belonging to one of the first and second lines and a second product situated immediately upstream and belonging to the other of said lines is less than a first determined set value, called the first pitch, consists in slowing down said first product relative to the second product on the belt without changing the running speed of the belt until the spacing between said first product from the first or second line and the associated second product from the other line reaches a predetermined, approximately zero, first value for which the first and second products are generally aligned in the transverse direction; and
  a second slowing-down step which, when the spacing value between a downstream product from the first line and the proximal product situated immediately upstream in the second line, is less than a second determined set value, called the second pitch, consists in slowing down said proximal product relative to the product situated downstream in the first line until the spacing between the proximal product from the second line and the product from the first line reaches a predetermined, nonzero value corresponding to at least the second set value of the second pitch;
  said first slowing-down step and said second slowing-down step being respectively employed selectively so as to bring into phase the spacing between two consecutive products respectively belonging to one or the other of the first and second lines according to a sequence determined according to the cell transfer device.

According to further features of the regulation method according to the invention, for a given running speed of the belt, the value of the first pitch is determined so that the transfer device has the minimum time lapse necessary to shift a cell transversely, and the value of the second pitch is determined so that the transfer device has the minimum time lapse necessary to shift two cells transversely at the same time.

Advantageously, the regulation method comprises:
  a first preliminary monitoring step, preceding the first slowing-down step, so as to determine whether the value of the spacing between a given first product belonging to one of the lines and a second product situated immediately upstream and belonging to the other of said lines is less than the first determined set value of the first pitch; and
  a second preliminary monitoring step, preceding the second slowing-down step, so as to determine whether the spacing value between a downstream product from the first line and the proximal product situated immediately upstream in the second line is less than a second determined set value of the second pitch.

Advantageously, the method also comprises:
  a first intermediate release step, following the first slowing-down step, in the course of which first regulation means let go of the first and second products, generally aligned in the transverse direction, so that the first and second products move at the running speed of the belt toward second regulation means situated downstream of the first regulation means; and
  a second intermediate release step, following the second slowing-down step, in the course of which the second regulation means let go of the slowed-down proximal product from the second line with a spacing relative to the preceding downstream product from the first line equal to at least the second pitch and so that said proximal product continues its movement downstream at the running speed of the belt in the direction of the cell transfer device.

The regulation method also comprises:
  a final detection step in the course of which detection means, arranged upstream of the transfer device, detect the presence of products in one and/or the other of the first and second lines so as to selectively control, after filling, the transfer device in order to shift by one filled cell or by two filled cells and so as to present one or two empty cells respectively in order to collect the following product(s).

The invention also relates to a layout of the type described above, characterized in that it comprises, between the arrival area and the output area of the belt:
  first regulation means, called the first phaser, which, when the spacing value between a given first product belonging to one of the first and second lines and a second product situated immediately upstream and belonging to the other of said lines is less than a first determined set value, called the first pitch, are able to selectively slow down said first product relative to the second product on the belt without changing the running speed of the belt until the spacing between said first product from the line and the associated second product from the other line reaches a predetermined, approximately zero, first value for which the first and second products are generally aligned in the transverse direction; and second regulation means, called the second phaser, arranged downstream of the first regulation means which, when the spacing value between a downstream product from the first line and the proximal product situated immediately upstream in the second line is less than a second determined set value, called the second pitch, are able to selectively slow down said proximal product relative to the product situated downstream in the first line until the spacing between the proximal product and the downstream product reaches a predetermined, nonzero value corresponding to at least the second set value of the second pitch.

According to other features of the layout according to the invention:

the first phaser comprises at least one retractable stop which is successively controlled between:

at least one engaged position in which the stop intervenes, by contact, in front of a given first product from one of the lines with a view to slowing it down until it is met by a second product situated immediately upstream in the other of the lines so that the spacing value, which is initially less than the first determined set value, called the first pitch, reaches a predetermined, approximately zero, first value for which said first and second products are generally aligned in the transverse direction; and at least one retracted position which makes it possible to allow said first and second products, aligned next to one another, to continue their movement downstream at the running speed;

in the engaged position the stop of the first phaser is controlled in downstream longitudinal translation at a determined speed, called the slowing-down speed, which is less than the running speed until the value of the spacing between the first and second products is approximately zero;

the second phaser comprises at least one retractable stop which is successively controlled between:

at least one engaged position in which the stop intervenes, by contact, in front of a proximal product from the second line with a view to slowing it down relative to the product situated immediately downstream in the first line, until the value of the spacing between said proximal product and the downstream product, which is initially less than the second determined set value, called the second pitch, reaches at least a predetermined, nonzero value corresponding to at least the second set value of the second pitch; and at least one retracted position which makes it possible to allow said slowed-down proximal product to continue its movement downstream at the running speed;

in the engaged position the stop of the second phaser is controlled in downstream longitudinal translation at a determined speed, called the slowing-down speed, which is less than the running speed until the slowed-down proximal product from the second line is spaced apart from the product situated downstream in the first line by a spacing with a value that reaches at least the second set value of the second pitch;

the first phaser and the second phaser each comprise at least one driving belt which bears at least one stop and which is arranged on the side of the upper face of the belt, the driving belt is wound over at least two driving pulleys such that a return strand of the driving belt extends approximately parallel to the upper face of the belt, the stop occupying engaged positions when it is situated on the return strand, and the phaser comprises means capable of rotationally driving the pulleys such that the longitudinal driving speed of the stop by the driving belt is equal to the slowing-down speed for the first phaser and to the slowing-down speed for the second phaser respectively;

the driving belt of the first phaser has a passive operating state in which it is halted, with each stop occupying a retracted standby position, and an active operating state in which the driving belt is rotationally driven around the pulleys such that a stop moves longitudinally downstream in the engaged position, and the driving belt is commanded into its active state when at least one sensor, arranged upstream of the first phaser, detects a second product belonging to one of the lines with a spacing value relative to a given first product situated immediately downstream and belonging to the other of said lines is less than the first determined set value, called the first pitch;

the stop of the first phaser is selectively commanded from its retracted standby position to its engaged position when the value of the spacing between a given first product belonging to one of the lines and a second product situated immediately upstream and belonging to the other of said lines is less than a first determined set value, called the first pitch;

the driving belt of the second phaser has a passive operating state in which it is halted, with each stop occupying a retracted standby position, and an active operating state in which the driving belt is rotationally driven around the pulleys such that a stop moves longitudinally downstream in the engaged position, and the driving belt is commanded into its active state when at least one sensor, arranged upstream of the second phaser, detects in the second line a proximal product with a spacing value relative to the product from the first line situated immediately downstream less than the second determined set value, called the second pitch; and the stop of the second phaser is selectively commanded from its retracted standby position to its engaged position when the value of the spacing between a downstream product from the first line and the proximal product situated immediately upstream in the second line is less than a second determined set value, called the second pitch.

Further features and advantages of the invention will become apparent on reading the following detailed description, for the understanding of which reference will be made to the appended drawings, in which:

FIGS. 1 and 2 are views from above of a layout according to a first design and a second design known from the prior art;

FIGS. 3 and 4 are views from the side and from above respectively of a layout comprising first and second regulation means designed for the implementation of the regulation method according to the invention;

FIG. 13 is a view from above of an example of a product flow according to a given sequence before its processing by the first phaser;

FIG. 14 is a view from above of the product flow according to FIG. 13 which illustrates the slowing down of some products carried out selectively by the first phaser;

FIG. 15 is a view from above of the product flow according to FIG. 14 after processing by the first phaser and before processing by the second phaser; and FIG. 16 is a view from above of the product flow according to FIG. 15 which illustrates the slowing down of some products from the second line carried out selectively by the second phaser.

Figure 5A:
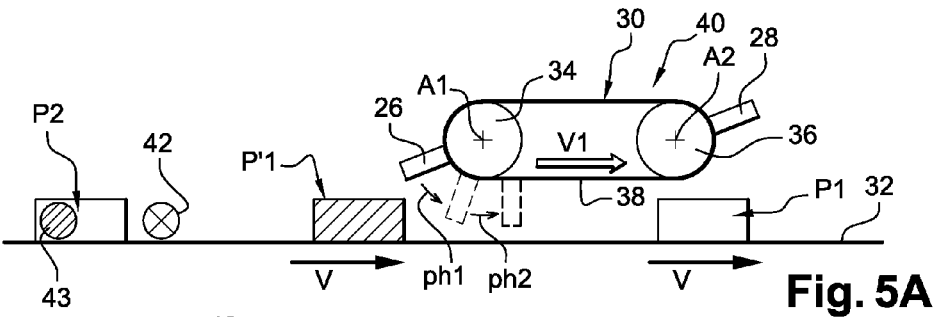
FIGS. 5A and 5B are respectively a view from the side and a view from above that schematically represent the first phaser of FIG. 3 or 4 when the driving belt is in the passive state.
Figure 5B:
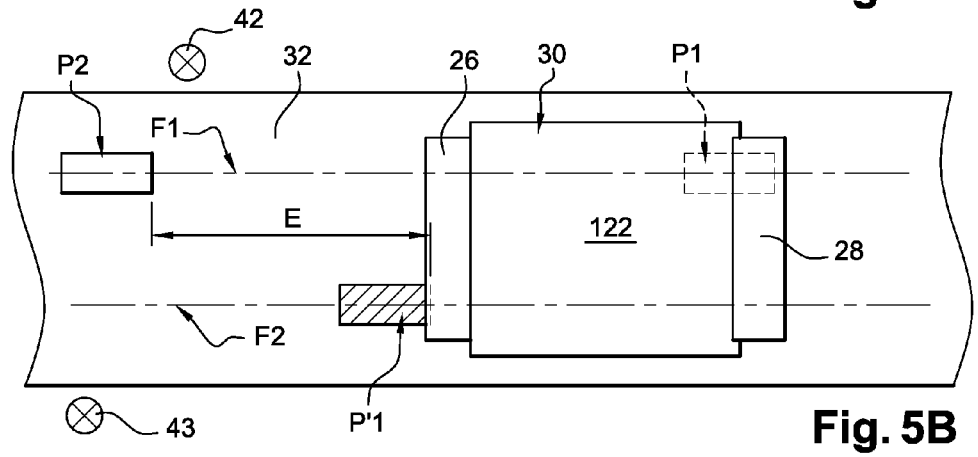

For the description of the invention the longitudinal, vertical and transverse directions, according to the reference frame L, V, T indicated in the figures, will be adopted without limitation in order to facilitate understanding.

In the following description, identical, similar or analogous elements will be denoted by the same reference numbers.

FIGS. 3 and 4 schematically represent a layout 10, generally similar to that 10a and 10b of FIGS. 1 and 2.

The layout 10 comprises a conveyor belt 12 that runs in a longitudinal direction from upstream to downstream, which corresponds to a general orientation from left to right in FIGS. 3 and 4.

The layout 10 comprises, upstream of the belt 12, a product feeder device comprising a first feeder belt 14 and a second feeder belt 16 which are intended to supply a flow F of products, which is intended then to be transported by the conveyor belt 12.

The belt 12 routes the flow F of products from upstream to downstream at a determined running speed V from an arrival area 18 to an output area 20 in order to feed a transfer device 24, called the collector, comprising cells Ai that form a train of cells.

The flow F of products respectively consists of a first line F1 comprising products Pn and a second line F2 comprising products P'n, the second line F2 extending parallel to the first line F1 in the longitudinal direction.

The products Pn from the first line F1 are supplied to the arrival area 18 of the conveyor belt 12 by the first belt 14 with a feeder speed VA1 while the products P'n from the second line F2 are supplied by the second belt 16 with a feeder speed VA2, which is, for example, here different from the feeder speed VA1 of the products Pn from the first line F1.

Consequently, as has previously been explained (FIG. 2), the flow F of products is likely to be disorderly in such a case, in particular the spacings between the products Pn from the first line F1 and the products P'n from the second line F2, which are variable, and their respective positions that are subjected to random phenomena.

By definition, a "spacing" corresponds in the remainder of the present description to the longitudinal distance between the downstream end of a first product Pn or Pn+1, belonging here to a given first line F1 or a given second line F2 respectively, and the downstream end of a second product Pn or Pn+1 situated immediately upstream of the first product Pn, Pn+1 belonging either to the same line F1, F2 or to the other line parallel to that containing the first product Pn or Pn+1.

As can be seen in FIGS. 3 and 4, the products Pn, P'n are positioned on the upper horizontal surface 32 of the belt 12, the spacings between the products from the same line F1, F2 are variable and the first and second lines F1, F2 are out of phase with each other, i.e. the products Pn, P'n are shifted longitudinally with respect to each other from one line to the next.

In the figures, the products P'n from the second line F2 have been hatched in order to allow them to be distinguished from the products Pn from the first line F1.

However, the products Pn and the products P'n, represented here schematically by parallelepipedal boxes, are preferably identical products which therefore differ only through the line to which they belong.

By definition, the spacing E1 corresponds, in the first line F1, to the separation in the longitudinal direction between two successive products Pn, or the distance between the downstream face of a product Pn and the downstream face of the product Pn+1 situated immediately upstream.

Analogously, the spacing E2 is defined in relation to the second line F2 as being the separation in the longitudinal direction between two successive products P'n, or the distance between the downstream face of a product P'n and the downstream face of the product P'n+1 situated immediately upstream.

As the first and second lines F1, F2 are out of phase with each other, a spacing E is further defined that corresponds to the separation in the longitudinal direction between the downstream faces of two successive products Pn, P'n each belonging to one of the lines F1, F2, or for example the distance between the downstream face of a product Pn from the first line F1 and the downstream face of the product P'n from the second line F2 situated immediately upstream of said product Pn in the flow F of products.

The transfer device or collector 24 is arranged downstream of the output area 20 of the belt 12 so as to present, opposite each of said first and second lines F1, F2 respectively, an associated empty cell Ai intended here to contain a product Pn or a product P'n.

For a given collector 24, a first time lapse T1 is determined corresponding to the minimum time required to effect a shift of one cell Ai, and a second time lapse T2 is determined corresponding to the minimum time required to carry out simultaneously a shift of two cells Ai, the time lapse T2 generally being approximately equal to double the time lapse T1.

As the running speed V of the belt 12 transporting the products Pn from the first line F1 and the products P'n from the second line is constant, and its value known, a first set value PAS1, called the first pitch, and a second set value PAS2, called the second pitch, are then determined.

Advantageously, for a given running speed V of the belt 12, the value of the first pitch PAS1 is determined such that the transfer device 24 has the minimum time lapse T1 required to shift a cell Ai transversely and the value of the second pitch PAS2 is determined such that the transfer device 24 has the minimum time lapse T2 required to shift two cells Ai, Ai+1 transversely at the same time.

FIG. 13 represents an example of a flow F of products running on the belt 12 and comprising a first sequence S1 consisting of a first product P1 and a second product P2 belonging to the first line F1 on the one hand, and of a first product P'1 belonging to the second line F2, the product P'1 being longitudinally positioned between the first product P1 and the second product P2.

The value of the spacing E between the product P'1 from the second line F2 and the product P2 from the first line F1 in this first sequence S1 is less than said first set value PAS1 or the first pitch.

The value of the spacing E1 between the product P1 and the product P2 from the first line F1 is conversely greater than or equal to the second set value PAS2, called the second pitch.

If such a sequence S1 were to reach the cells Ai of the collector 24 directly, the first product P1 from the first line F1 would hence enter the cell A1 situated opposite, then the first product P'1 would come into collision with the collector 24 before the latter has been able to effect the shift required so that the product P'1 is received in the following cell A2.

This is because, as the first product P1 belongs to the first line F1 and the following product P'1 to the second line F2, the collector 24 must in this case be able to carry out a shift of two cells at the same time in order to present an empty cell A2 opposite the second line F2.

Yet the spacing between the products P1 and P'1 is not sufficient for the collector 24 to have the time lapse T2 required for such a shift of two cells Ai, Ai+1.

In addition, assuming that it was possible for the first product P'1 to be received in the cell A2, another incident would then occur with the following product P2 because, as the spacing between the product P'1 and the product P2 is less than the first pitch PAS1, the collector 24 also does not have the time lapse T1 required in order to shift the cell A2 filled with P'1 and to present two new cells A3 and A4 respectively opposite the second and the first line F2, F1.

In order to solve these problems, the invention proposes a regulation method designed to bring into phase the spacing between two consecutive products Pn, P'n belonging to one and/or the other of the first and second lines F1, F2 according to a sequence PAS1, PAS2 which is advantageously determined as a function of the characteristics of the cell transfer device 24 such that the collector 24 has the time lapse T1 and/or T2 required to selectively shift its train by one or two cells Ai, Ai+1 according to the product sequence Pn, P'n.

According to the invention, the regulation method is characterized in that it comprises at least:

a first slowing-down step which, when the spacing value E between a given first product Pn, P'n belonging to one of the lines F1, F2 and a second product Pn, P'n situated immediately upstream and belonging to the other of said lines F1, F2 is less than a first determined set value, called the first pitch PAS1, consists in slowing down said first product Pn, P'n relative to the second product Pn, P'n on the belt 12 without changing the running speed V of the belt 12 until the spacing E between said first product Pn, P'n from the line F1, F2 and the associated second product Pn, P'n from the other line F1, F2 reaches a predetermined, approximately zero, first value for which the first and second products Pn, P'n are generally aligned in the transverse direction; and a second slowing-down step which, when the spacing value E between a downstream product Pn from the first line F1 and the proximal product P'n situated immediately upstream in the second line F2, is less than a second determined set value, called the second pitch PAS2, consists in slowing down said proximal product P'n relative to the product Pn situated downstream in the first line F1 until the spacing E between the proximal product P'n from the second line F2 and the product Pn from the first line F1 reaches a predetermined, nonzero value corresponding to at least the second set value PAS2 of the second pitch.

The first slowing-down step and the second slowing-down step according to the invention are respectively employed selectively so as to bring into phase the spacing E between two consecutive products Pn and P'n respectively belonging to one and the other of the first and second lines F1, F2 according to a sequence PAS1, PAS2 which is determined depending on the transfer device 24 for transfer into cells Ai.

Advantageously, the first slowing-down step and the second slowing-down step are carried out successively, one after the other.

Advantageously, for a given running speed V of the belt 12, the value of the first pitch PAS1 is determined so that the transfer device 24 has the minimum time lapse T1 necessary to shift a cell Ai transversely, and the value of the second pitch PAS2 is determined so that the transfer device 24 has the minimum time lapse T2 necessary to shift two cells Ai, Ai+1 transversely at the same time.

Advantageously, the regulation method comprises:

a first preliminary monitoring step, preceding the first slowing-down step, so as to determine whether the value of the spacing E between a given first product Pn, P'n belonging to one of the lines F1, F2 and a second product Pn, P'n situated immediately upstream and belonging to the other of said lines F1, F2 is less than a first determined set value PAS1 of the first pitch; and a second preliminary monitoring step, preceding the second slowing-down step, so as to determine whether the spacing value E between a downstream product Pn from the first line F1 and the proximal product P'n situated immediately upstream in the second line F2 is less than a second determined set value PAS2 of the second pitch.

The invention also proposes a layout 10 comprising first regulation means, called the first phaser 122, and second regulation means, called the second phaser 222, designed to implement the regulation method.

The first phaser 122 and the second phaser 222 are arranged between the arrival area 18 and the output area 20 of the belt 12, the second phaser 222 being positioned downstream of the first phaser 122.

Advantageously, the first phaser 122 and the second phaser 222 are capable of each being controlled selectively in accordance with the regulation method according to the invention.

In the following, FIGS. 5 to 8 will be described, which represent in detail the operation of the first phaser 122 forming the first regulation means in the case of processing the first sequence S1 of the previously described flow F, shown in FIG. 13.

The first phaser 122 is capable of slowing down a first product Pn, P'n relative to a second product Pn, P'n on the belt 12 without changing the running speed V of the belt 12 until the spacing E between said first product Pn, P'n from the line F1, F2 and the associated second product Pn, P'n from the other line F1, F2 reaches a predetermined, approximately zero, first value for which the first and second products Pn, P'n are generally aligned alongside each other in the transverse direction.

In accordance with the regulation method according to the invention, the first phaser 122 is selectively controlled in order to carry out the first slowing-down step when the value of the spacing E between a given first product Pn, P'n belonging to one of the lines F1, F2 and a second product Pn, P'n situated immediately upstream and belonging to the other of said lines F1, F2 is less than the first determined set value, called the first pitch PAS1.

Advantageously, the first phaser 122 comprises at least one retractable stop 26, 28 which is successively controlled between:

- at least one engaged position in which the stop 26, 28 intervenes, by contact, here in front of a first product P'1 from the second line F2 with a view to slowing it down until it is met by the second product P2 situated immediately upstream in the first line F1 so that the spacing value E, which is initially less than the first determined set value corresponding to the first pitch PAS1, reaches a predetermined, approximately zero, first value for which said first and second products P'1 and P2 are generally aligned in the transverse direction; and
- at least one retracted position which makes it possible to allow said first and second products P'1 and P2, aligned next to one another, to continue their movement downstream at the running speed V.

It will be observed that the first slowing-down step produced by the first phaser 122 leads to reorganization of the first and second products P'1 and P2 into the form of a batch Li of two products aligned next to each other in the same row in a transverse direction.

FIGS. 5 to 8 represent an exemplary embodiment of a first phaser 122 preferably comprising a first stop 26 and a second stop 28.

The first phaser 122 is vertically positioned above the belt 12 and it is centered over the belt 12 relative to the first line F1 and to the second line F2 so as to be able to act on the products Pn and the products P'n respectively which each of the lines F1, F2 contains.

Advantageously, the first phaser 122 is mounted in a transversely movable manner so as to be able to adjust its position, in particular as a function of the transverse distance or separation between the first line F1 of products Pn and the second line F2 of products P'n.

The first phaser 122 comprises a driving belt 30 which is arranged on the side of the upper face 32 of the belt 12 and which is able to drive, in displacement, at least one stop, here the two stops 26, 28.

As a variant the first phaser 122 comprises three or more stops depending on the applications.

The driving belt 30 is wound over an upstream pulley 34 and over a downstream pulley 36 with axes A1, A2 that are transverse relative to the longitudinal direction.

The two pulleys 34, 36 are here arranged above the belt 12 such that the return strand 38 of the driving belt 30 extends approximately parallel to the upper face 32 of the belt 12, and such that the stops 26, 28 are approximately centered transversely relative to the lines F1 and F2 of the belt 12 and are able to act on the products Pn and the products P'n of the lines F1 and F2 respectively.

The downstream pulley 36 is provided to be driven rotationally by means of a servomotor 40 so as to drive the driving belt 30 rotationally around the pulleys 34, 36 and so that the return strand 38 moves in the same direction as the belt 12. To this end, the downstream pulley 36 is driven rotationally in the counter-clockwise direction, considering FIGS. 6A and 7A.

The driving belt 30 bears, on its outer face, the first stop 26 and the second stop 28, which are similar and are longitudinally arranged at approximately opposite positions along the driving belt 30.

Setting the driving belt 30 in motion around the pulleys 34, 36 therefore drives the displacement of the stops 26, 28.

Each stop 26, 28 here has the general form of a transverse plate perpendicular to the portion of the driving belt 30 that bears it.

As a variant, the form and the materials used for the manufacture of the stops 26, 28 may vary, in particular depending on the type of product processed.

The height of the return strand 38 of the driving belt 30 and/or the height of each stop 26, 28 relative to the upper face 32 of the belt 12 is such that when a stop 26, 28 is situated on the return strand 38 it constitutes an obstacle to the passage of the products Pn from the first line F1 and/or the products P'n from the second line F2, which corresponds to a position called the engaged position of the stop 26, 28.

Figure 6A:
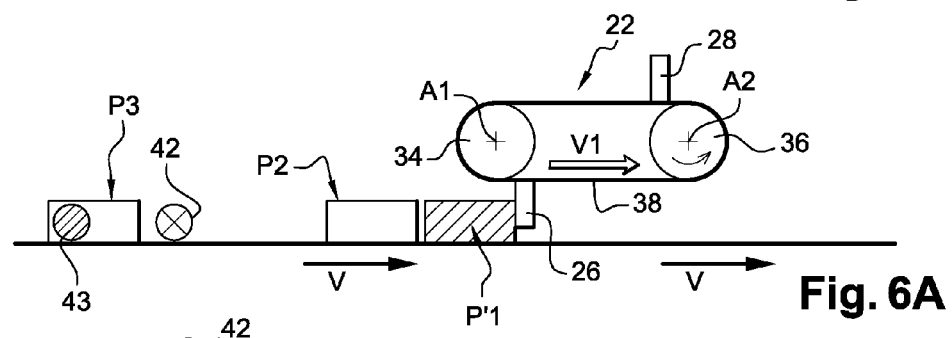
FIGS. 6A and 6B are views, similar to the preceding ones, which represent the first phaser when the driving belt is in the active state and which illustrate the start of the engagement of a stop with a product in order to constitute a batch of two products when the spacing is less than the first pitch.
Figure 6B:
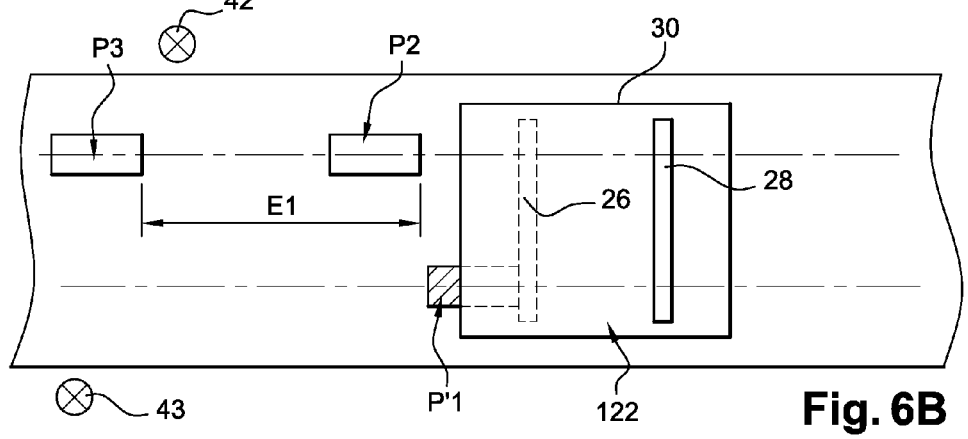
Figure 7A:
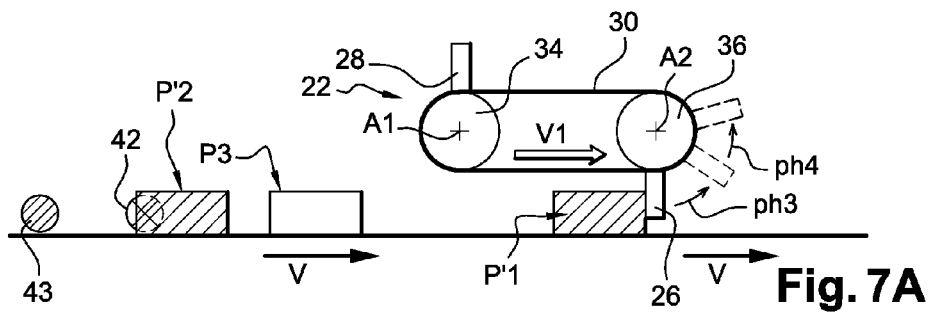
FIGS. 7A and 7B are views, similar to the preceding ones, which represent the first phaser when the driving belt is in the active state just before the products are released.
Figure 7B:
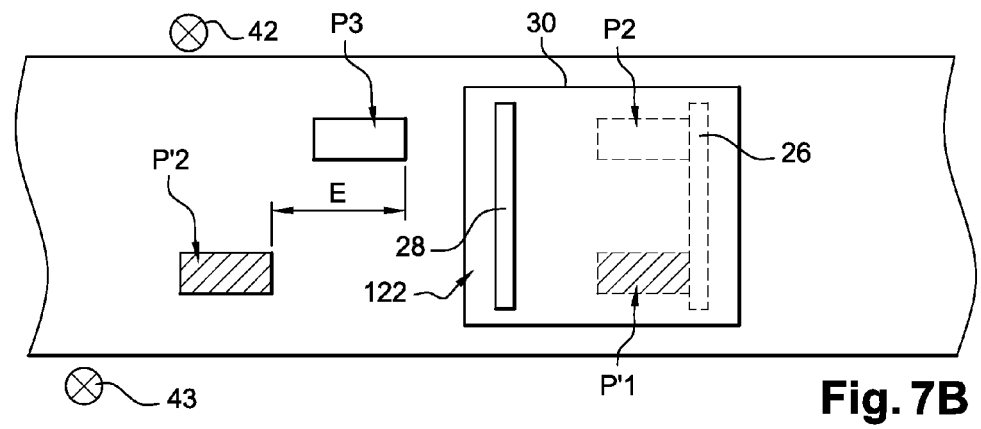

When a stop 26, 28 occupies an engaged position, the opposite stop 26, 28 occupies a retracted position, which is the case for example in FIGS. 6A and 7A where the first stop 26 occupies an engaged position and where the second stop 28 occupies a retracted position.

Figure 8A:
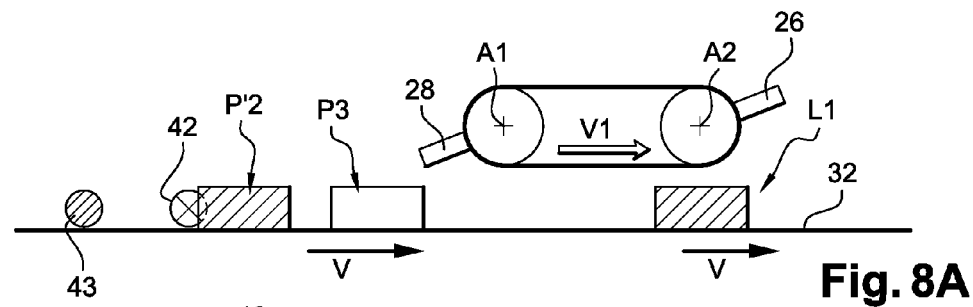
FIGS. 8A and 8B are views, similar to the preceding ones, which represent the first phaser when the driving belt is in the passive state just after the products have been released and just before the engagement of a stop with a new product.

The stops 26, 28 may also occupy intermediate positions, shown in FIGS. 5A and 8A, when they are situated on the wound portions of the driving belt 30.

In FIG. 5A the intermediate position occupied by the first stop 26 is called the upstream standby position and the intermediate position occupied by the second stop 28 is called the downstream standby position. These standby positions are respectively retracted positions.

In the upstream standby position, the first stop 26 is situated at the height of the upstream pulley 34. It is close to an engaged position, but sufficiently inclined upstream so as not to hinder the passage of products Pn from the first line F1 or of products P'n from the second line F2 below the return strand 38 of the driving belt 30.

In the downstream standby position, the second stop 28 is situated at the height of the downstream pulley 36 and it consequently cannot interfere or be an obstacle during the passage of products Pn and/or of products P'n below the return strand 38.

In FIG. 8A, the two stops 26, 28 occupy inverted positions in relation to FIG. 5A, the second stop 28 occupying an upstream standby position and the first stop 26 occupying a downstream standby position.

Advantageously, the driving belt 30 is successively commanded into a passive state and into an active state.

In its passive state, which is illustrated by FIGS. 5A and 8A, the driving belt 30 is halted and the stops 26, 28 occupy their standby positions.

In the active state of the driving belt 30, which is illustrated by FIGS. 6A and 7A, the servomotor 40 drives the driving belt 30 rotationally around the pulleys 34, 36, which causes a longitudinal displacement of the stops 26, 28 above the belt 12 at a speed called the slowing-down speed V1 which is less than the running speed V of the belt 12.

The slowing-down speed V1 is preferably approximately constant and corresponds to the longitudinal speed VL of displacement of the stops 26, 28.

Considering FIGS. 5A to 8A, the first stop 26 moves downstream from its upstream standby position to its downstream standby position, and the second stop 28 moves upstream from its downstream standby position to its upstream standby position.

In the course of the displacement of the first stop 26 downstream, this occupies engaged positions.

Advantageously, the driving belt 30 is commanded into its active state and into its passive state depending on signals emitted by detection means that are arranged between the arrival area 18 and the first phaser 122, for example by at least one sensor or encoder 42.

The sensor 42 is here preferably able to detect the products Pn from the first line F1.

As a variant, the sensor 42 is able to detect the passage of products Pn from the first line F1 and/or of products Pn+1 from the second line F2 and is arranged above the surface 32 of the belt 12.

The sensor 42 consists, for example, of an electrical cell arranged at the edge of the belt 12 which is adjacent the first line F1 or above this and electrically connected to the servomotor 40 in such a way that the detection of a determined product, such as the first product P1, produces a detection signal that is capable of being exploited, in particular for various functions detailed below.

Advantageously, the detection signal from the sensor 42 is exploited to monitor the spacing between a downstream product Pn and an upstream product Pn+1 in the first line F1, i.e. for determining the spacing value E1.

Advantageously, the detection means of the layout 10 comprise other means, such as at least one sensor and/or encoder 43, which are associated with the second line F2 and which are in particular capable of detecting the arrival of products P'n from the second line F2 on the belt 12.

Analogously, the sensor 43 is capable of producing another detection signal which is exploited to monitor the spacing between a downstream product P'n and an upstream product P'n+1 in the second line F2, i.e. for determining the spacing value E2.

Advantageously, it is possible to determine, by comparing the signals respectively emitted by the sensors 42 and 43 of the detection means, whether the value of the spacing E between a product Pn from the first line F1 and the product P'n from the second line F2 situated immediately upstream, and vice versa between a product P'n from the second line F2 and the product Pn from the first line F1 situated immediately upstream, is less than the first determined set value, called the first pitch PAS1.

Using the detection means 42, 43 the first preliminary monitoring step, preceding the first slowing-down step, is advantageously carried out, which step consists in determining whether the value of the spacing E between a given first product Pn, P'n belonging to one of the lines F1, F2 and a second product Pn, P'n situated immediately upstream and belonging to the other of said lines F1, F2 is less than a first determined set value PAS1 of the first pitch.

Advantageously, the first and/or the second detection signal from the detection means 42, 43 are also exploited in real time for the selective control of the phaser 122, in particular in order to ensure the synchronous starting of the servomotor 40 at the appropriate moment.

Advantageously, the control of the driving of the driving belt 30 of the phaser 122 is synchronized with the detection of product Pn, Pn+1 such that the first phaser 122 is capable of processing the products whatever the value of the spacings E1, E2 or E.

This feature of selective operation is particularly advantageous for enabling reliable operation of the layout 10 according to the invention at a high rate, for example beyond 900 products per minute, and when the feeder belts 14, 16 have different speeds VA1, VA2.

The slowing-down speed V1 of the first phaser 122 is determined, according to the sequence S1 shown (FIG. 13), such that while the product P'1 from the second line F2 covers the longitudinal distance, called the slowing-down distance, between the upstream and downstream engaged positions of a stop 26, 28, the product P2 from the first line F1 simultaneously covers, at the running speed V, a longitudinal distance corresponding to the sum of said slowing-down distance and the upstream spacing E.

The slowing-down distance therefore corresponds overall to the interaxial distance A1-A2 of the phaser 22 or to the length of the strand 38 of the driving belt 30 such that, apart from determining the slowing-down speed V1, the slowing-down distance is also capable of being adjusted by changing, in particular, the length of the driving belt 30 with an adjustable interaxial distance A1-A2 or the relative position of the stops 26, 28.

In the following, the operation of the first phaser 122 will be described in detail.

When the driving belt 30 is in a passive state where the first stop 26 occupies its upstream standby position (FIG. 5A), the sensors 42, 43 detect the arrival of products Pn, P'n upstream and determine the value of the spacing E.

The detection means 42, 43 are advantageously arranged upstream of the first phaser 122, preferably from the arrival area 18 onwards.

According to the first sequence S1, the spacing E between the product P'1 from the second line F2 and the product P2 from the first line F1 is less than the value of the first pitch PAS1.

In the case of the first sequence S1, the first phaser 122 will slow down the product P'1 forming the first product relative to the product P2 forming the second product.

It is consequently the detection signal emitted by the sensor 43 that is here exploited to cause, selectively and synchronously with the movement of the product P'1, the starting of the servomotor 40 so that the driving belt 30 passes from its passive state to its active state, and so that the first stop 26 passes from its upstream standby position to its engaged position, as shown in FIGS. 5A and 6A.

The first stop 26 is then driven longitudinally downstream at the slowing-down speed V1.

As the slowing-down speed V1 of the first stop 26 is less than the running speed V of the first product P'1, the product P'1 meets the first stop 26 and stops against the upstream transverse side thereof, which causes slipping of the first product P'1 on the belt 12.

The first product P'1 then moves longitudinally at the slowing-down speed V1 imposed by the first stop 26, until the first stop 26 comes to occupy a retracted position.

Note that, while the driving belt 30 is passing from the passive state to the active state, the starting of the servomotor 40 comprises a prior acceleration phase ph1 which enables the driving belt 30 to shift from a zero longitudinal drive speed VL to a stabilized longitudinal drive speed VL equal to the slowing-down speed V1.

The upstream standby position is preferably chosen in such a way that the first stop 26 reaches an intermediate engagement position at the end of the acceleration phase ph1 before it has reached its first vertical engaged position.

FIG. 5A shows the intermediate engagement position of the first stop 26 in thin broken lines and the first vertical engaged position of the first stop 26 in thick broken lines.

The phase of movement of the first stop 26 between the intermediate engagement position and the first vertical engaged position is called the engagement phase ph2.

The moment the servomotor 40 is started is, for example, offset in relation to the signal, here from the sensor 43, such that the first product P'1, arriving at the running speed V, comes into contact synchronously with the first stop 26 during the engagement phase ph2.

Thus, when the first stop 26 occupies its first vertical engaged position, the first product P'1 is blocked bearing against the first stop 26, which is illustrated by FIG. 6A.

From then on, being blocked bearing against the first stop 26, the first product P'1 moves longitudinally at the slowing-down speed V1.

As the product P2 from the first line F1 always moves on the belt 12 at the running speed V, the upstream spacing E will progressively reduce until reaching a zero value when the product P2 meets the first product P'1 in order to find itself also blocked bearing against the first stop 26 and consequently transversely aligned with each other in the same row.

The slowing-down speed V1 and the interaxial distance A1-A2 between the two pulleys 34, 36 are therefore advantageously chosen as a function of the running speed V and as a function of the maximum values of the upstream spacing E between the products Pn from the first line F1 and the products P'n from the second line F2.

The second product P2 meets the first product P1 immediately before the first stop 26 passes from its engaged position to its retracted position, i.e. generally at the height of the downstream pulley 36, which is illustrated more specifically by FIG. 7A.

Advantageously, the tipping of the stop 26 into its retracted position is carried out when, once the product P2 has met the product P'1, a first batch L1 is formed.

Advantageously, for each application the characteristics of the first phaser 122 are determined so that the products Pn, P'n cannot be freed by the tipping of the stop 26 before having been aligned transversely with each other.

More precisely, the slowing-down speed V1 and the interaxial distance A1-A2 between the upstream 34 and downstream 36 pulleys are determined in relation to a maximum desired rate and such that the spacing E, here between the two products P'1, P2 is reduced under the phaser 122 until systematically reaching a zero value.

Figure 8B:
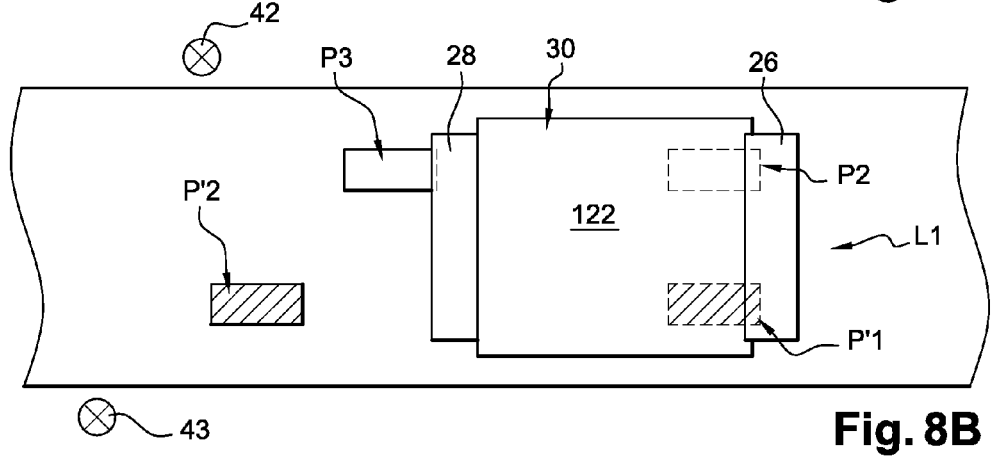

As shown in FIG. 8B, the products P'1 and P2 are reorganized transversely alongside each other so as to form a row and are aligned in a direction of transverse movement of cells Ai of the collector 24.

On arriving at the height of the downstream pulley 36, the first stop 26 retracts and comes to occupy its downstream standby position, shown in FIG. 8A. The driving belt 30 then passes from its active state to its passive state.

The tipping of the first stop 26 from a final vertical engaged position, which is shown in continuous lines in FIG. 7A, to an intermediate disengagement position, which is shown in thin broken lines in FIG. 7A, is called the disengagement phase ph3.

The first product P'1 and the second product P2 of batch L1 are then let go by the first stop 26 in the course of the disengagement phase ph3, which allows the products P'1, P2 to continue their longitudinal journey downstream at the running speed V.

The end of the disengagement phase ph3 corresponds to the start of a phase called the deceleration phase ph4, in the course of which the longitudinal drive speed VL of the driving belt 30 shifts from the slowing-down speed V1 to a speed of zero, and in the course of which the first stop 26 passes from its intermediate disengagement position to its downstream standby position, which is shown in thick broken lines in FIG. 7A.

The first phaser 122 thus carries out, in accordance with the method according to the invention, a first intermediate release step that follows the first slowing-down step and in the course of which the stop 26, 28 of the first phaser 122 lets go of the first and second products Pn, P'n generally aligned in the transverse direction, here the products P'1 and P2 according to the first sequence S1, in such a way that the products Pn, P'n once again move at the running speed V of the belt 12 towards the second regulation means formed by the second phaser 222 situated downstream.

The first phaser 122 has thus carried out a first complete cycle corresponding to the processing of the first sequence S1.

As illustrated in FIG. 8A, when the second stop 28 is occupying its upstream standby position, the first phaser 122 is then ready to slow down a new product Pn or P'n from one of the lines F1, F2 for which the value of the spacing E relative to the product Pn or P'n situated immediately upstream in the other line F1, F2 is less than the value of the first pitch PAS1.

In fact, after the processing of the first sequence S1, the flow F of products shown in FIG. 13 continues to be transported on the belt 12.

In FIG. 13, the flow F of products Pn, P'n has been arbitrarily split into different successive sequences so as to facilitate description and understanding of the invention.

Advantageously, the stop 26, 28 of the first phaser 122 is selectively commanded from its retracted standby position into its engaged position when the value of the spacing E between a given first product Pn, P'n belonging to one of the lines F1, F2 and a second product Pn, P'n situated immediately upstream and belonging to the other of said lines F1, F2 is less than a first determined set value, called the first pitch PAS1.

Such will be the case in the second sequence S2 of FIG. 13, which consists of a product P3 and a product P4 belonging to the first line F1 and of a product P'2 belonging to the second line F2.

Indeed, using the detection means 42, 43 it is determined in this second sequence that the value of the spacing E between the product P3 from the first line F1 and the product P'2 from the second line F2 is less than the value of the first pitch PAS1.

From then on, the servomotor 40 of the first phaser 122 is controlled to produce a second cycle similar to the first cycle that has just been described.

In the course of this second cycle, the second stop 28 will slow down the product P3 until it is met by the product P'2 to form a second batch L2 of products aligned transversely alongside one another.

It will be observed that, as the first phaser 122 is centered relative to the first and second lines F1, F2 and the stops 26, 28 extend transversely so as to be able to act on the products Pn, P'n from one or the other of the lines F1, F2, the first slowing-down step is capable of being implemented irrespective of whether the first product Pn, P'n to be slowed down belongs to the first line F1, like the product P3 of the second sequence S2, or else whether it belongs to the second line F2, like the product P'1 in the first sequence S1.

The regulation of the flow F by the first phaser 122 then continues for the third and fourth sequences S3 and S4 shown in FIG. 13.

As can be better seen in FIG. 14, for each of these sequences S3 and S4 the first phaser 122 will successively carry out a new cycle.

For the third sequence S3, the first phaser 122 will slow down the product P'3 from the second line F2 in order to align it transversely and to form a batch with the product P6 from the first line F1.

Likewise, for the fourth sequence S4 the first phaser 122 carries out a new first slowing-down step so as to slow down the product P'4 from the second line F2 in order to form another batch with the product P7 from the first line F1.

FIG. 15 shows the flow F of products after processing by the first phaser 122.

In the following it will be described what happens while feeding the cells Ai of the collector 24 in the absence of a second phaser 222 according to the invention in order to carry out the second slowing-down operation of the regulation method.

Indeed, if the first sequence S1 is considered, the product P1 from the first line F1 is intended to be received in a first cell A1, then the collector 24 shifts by two cells to present two empty cells A2, A3 and receive the products P2 and P'1 forming the batch L1.

As the spacing between the product P1 and the products P2, P'1 from the batch L1 is here greater than the value of the second pitch PAS2, the collector 24 has the time lapse T2 required to carry out this shifting operation.

Then, considering the second sequence S2, the collector 24 once again shifts by two cells in order to receive the batch L2 formed by the products P3 and P'2, and, since the spacing between the product P3 and the product P4 from the first line F1 is greater than or equal to the value of the first pitch PAS1, the collector 24 has the time lapse T1 required to carry out a shift by one cell with a view to receiving the product P4.

Advantageously, the layout 10 comprises, upstream of the collector 24 and downstream of the second phaser 222, detection means 45 that are capable of recognizing the position of the products Pn, P'n in one and/or the other of the lines F1, F2 in order to determine whether it is a batch containing two products Pn and P'n side by side or a single product situated in one or the other of the lines F1, F2.

The detection means 45 are preferably also capable of counting the number of products Pn and P'n conveyed to the collector 24.

The detection means 45 are capable of emitting a corresponding detection signal that is capable of being exploited in order to selectively control the collector 24 by carrying out, according to the case, a shift by one cell or a shift by two cells at the same time such that the cells Ai of the collector 24 are systematically filled by a product Pn or P'n and such that the train of cells never contains an empty cell after having passed opposite the arrival area 20 of the belt.

Advantageously, the method according to the invention comprises a final detection step in the course of which the detection means 45 detect the presence of the products Pn, P'n in one and/or the other of the first and second lines F1, F2 so as to selectively control the collector 24.

After filling one of two cells, the collector 24 is therefore controlled as a function of the following products Pn and/or P'n.

The collector 24 is thus controlled so as to selectively shift the cell A1 containing P1 then the two cells A2, A3 filled by L1, or by the products P'1 and P2, and respectively to present one or two empty cells intended to collect the following product(s) Pn, P'n, here two cells A4, A5 for the products P3, P'2 forming the batch L2.

While the third sequence S3 does not present any particular problem for the transfer of the products P5, P'3, P6 to the collector 24, it is not the same for the fourth sequence S4.

This is because in this sequence S4 the spacing between the product P'5 situated in the second line F2 and the batch L4 formed of the products P7 and P'4 situated downstream is less than the value of the second pitch PAS2 so that the collector 24 does not have the time lapse T2 required, after filling cells with the products P7 and P'4 of the batch L4, to shift by two cells, allowing it once again to present two empty cells, in particular a cell opposite the second line F2 in order to receive the product P'5.

It should be noted that the problem posed by the sequence S4 would be similar if the latter did not contain the product P'4 associated with the product P7 to form the batch L4.

This is because once a sequence comprises a product Pn, here the product P7, in the first line F1 immediately followed upstream by a product P'n, here the product P'5, in the second line F2, it is necessary that the spacing E between these two products P7, P'5 has a value greater than or equal to the second determined set value PAS2.

By default, after the product P7 has entered the cell the collector 24 does not have the time required in order to shift by two cells Ai at the same time allowing an empty cell Ai once again to be presented opposite the second line F2 and the product P'5 to be received.

Such a sequence is therefore, due to the very fact that the value of the spacing E between the products P7 and P'5 is less than the second pitch PAS2, likely to cause an incident, and this independently of the presence or absence of the product P'4 alongside the product P7 or else of the presence of another product Pn alongside the product P'5.

This is the reason for which the second slowing-down step according to the invention is carried out by means of the second phaser 222.

The second phaser 222 is capable of selectively slowing down a proximal product P'n from the second line F2 relative to the product Pn situated downstream in the first line F1 until the spacing E between the proximal product P'n and the downstream product Pn reaches a predetermined nonzero value corresponding to at least the second set value PAS2, called the second pitch.

In accordance with the regulation method according to the invention, the second phaser 222 is selectively controlled in order to produce said second slowing-down step when the value of the spacing E between a downstream product Pn from the first line F1 and the proximal product P'n situated immediately upstream in the second line F2 is less than a second determined set value PAS2, called the second pitch.

Advantageously, the layout 10 comprises detection means 44 which are, for example, similar to the detection means 42 and 43 previously described for the first phaser 122.

Advantageously, the detection means 44 are capable of distinguishing the products Pn and P'n from the lines F1 and F2 so as to emit a signal representing the value of the spacing E between a product Pn from the first line F1 and a product P'n from the second line F2.

Using these means 44, a second preliminary monitoring step, preceding the second slowing-down step, is carried out so as to determine whether the value of the spacing E between a downstream product Pn from the first line F1 and the proximal product P'n situated immediately upstream in the second line F2 is less than a second determined set value PAS2 of the second pitch.

FIGS. 9 to 12 show in detail the operation of the second phaser 222, forming the second regulation means, which illustrate more specifically the second slowing-down step and the second intermediate release step.

The exemplary embodiment of the second phaser 222 shown in FIGS. 9 to 12 will be described in the following by comparison with the first phaser 122.

The second phaser 222 preferably comprises at least one stop, here a first stop 46 and a second stop 48.

The second phaser 222 is positioned vertically above the belt 12 and it is centered over the second line F2.

Consequently, the second phaser 222 is capable of acting only on the products P'n from the second line F2.

The second phaser 222 comprises a driving belt 50 that is arranged on the side of the upper face 32 of the belt 12 and which is capable of driving, in displacement, the two stops 46, 48.

The driving belt 30 is wound over an upstream pulley 52 and over a downstream pulley 54 with axes A1, A2 that are transverse in relation to the longitudinal direction.

The two pulleys 52, 54 are here arranged above the belt 12 such that the return strand 56 of the driving belt 50 extends approximately parallel to the upper face 32 of the belt 12, and such that the stops 46, 48 are approximately centered transversely relative to the second line F2 of products P'n.

The downstream pulley 54 is provided to be rotationally driven by means of a servomotor 58 so as to drive the driving belt 50 rotationally around the pulleys 52, 54 and such that the return strand 56 moves in the same direction as the belt 12. To this end, the downstream pulley 54 is rotationally driven in the counter-clockwise direction, considering FIGS. 10A and 11A.

The driving belt 50 bears, on its outer face, the first stop 46 and the second stop 48, which are similar and are longitudinally arranged at approximately opposite positions along the driving belt 50.

Setting the driving belt 50 in motion around the pulleys 52, 54 therefore drives the displacement of the stops 46, 48.

Each stop 46, 48 here has the general form of a transverse plate perpendicular to the portion of the driving belt 50 that bears it.

The height of the return strand 56 of the driving belt 50 and/or the height of each stop 46, 48 relative to the upper face 32 of the belt 12 is such that when a stop 46, 48 is situated on the return strand 56 it constitutes an obstacle to the passage of products P'n from the second line F2, which corresponds to a position called the engaged position of the stop 46, 48.

Figure 10A:
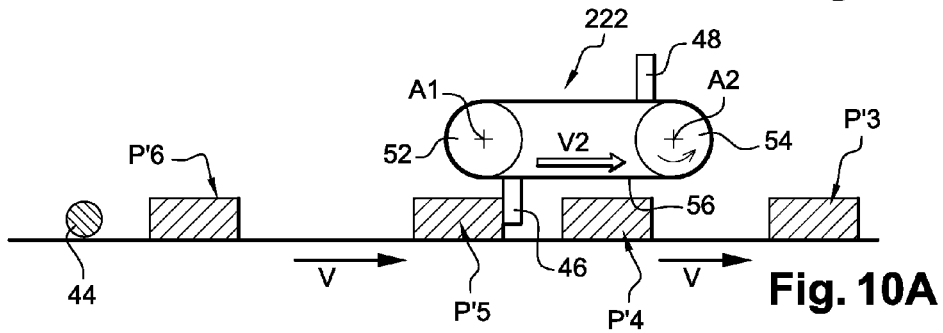
FIGS. 10A and 10B are views, similar to the preceding ones, which represent the second phaser when the driving belt is in the active state and which illustrate the start of the engagement of a stop with a product from the second line in order to separate it from the product preceding it by a spacing at least equal to the second pitch.
Figure 10B:
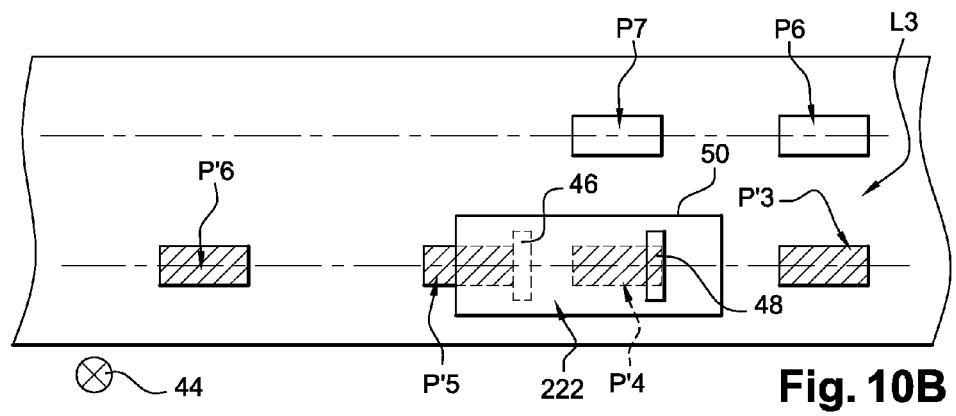
Figure 11A:
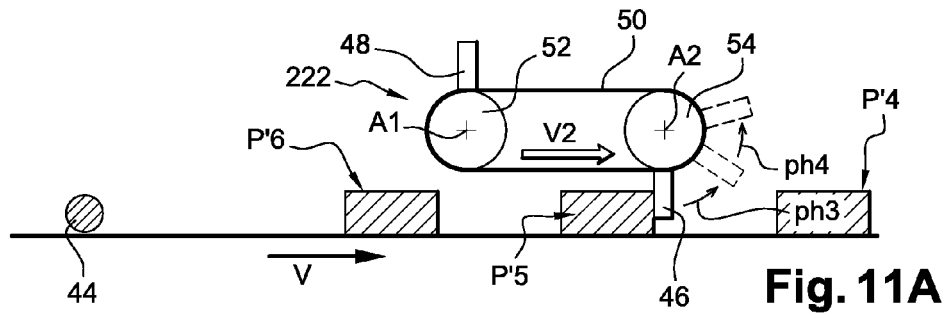
FIGS. 11A and 11B are views, similar to the preceding ones, which represent the second phaser when the driving belt is in the active state just before the slowed-down proximal product is released.
Figure 11B:
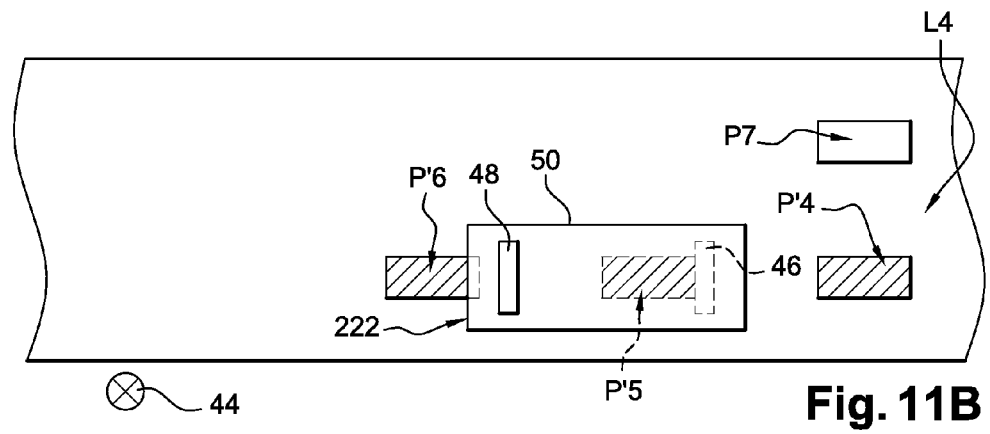

When a stop 46, 48 occupies an engaged position, the opposite stop 46, 48 occupies a retracted position, which is the case for example in FIGS. 10A and 11A where the first stop 46 occupies an engaged position and where the second stop 48 occupies a retracted position.

The stops 46, 48 may also occupy intermediate positions, shown in FIGS. 10A and 11A, when they are situated on the wound portions of the driving belt 50.

Figure 9A:
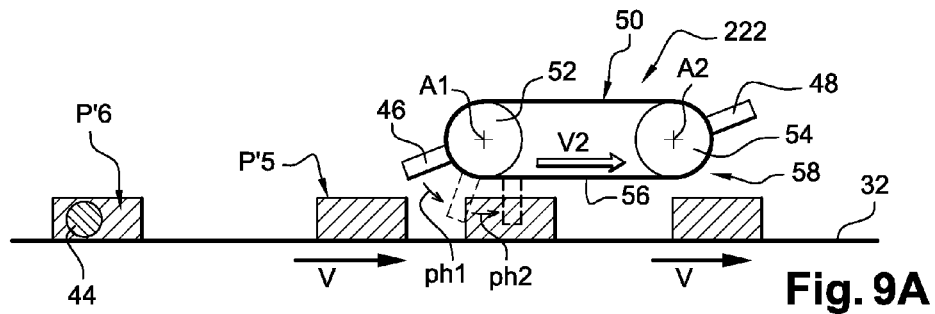
FIGS. 9A and 9B are respectively a view from the side and a view from above that schematically represent the second phaser of FIG. 3 or 4 when the driving belt is in the passive state.
Figure 9B:
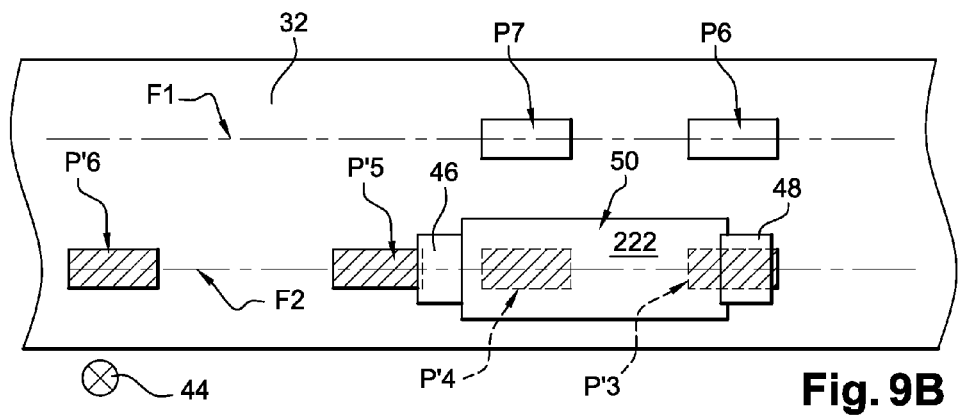

In FIG. 9A the intermediate position occupied by the first stop 46 is called the upstream standby position and the intermediate position occupied by the second stop 48 is called the downstream standby position. These standby positions are respectively retracted positions.

In the upstream standby position, the first stop 46 is situated at the height of the upstream pulley 52. It is close to an engaged position, but sufficiently inclined upstream so as not to hinder the passage of products P'n from the second line F2 below the return strand 56 of the driving belt 50.

In the downstream standby position, the second stop 48 is situated at the height of the downstream pulley 54 and it consequently cannot interfere or be an obstacle during the passage of products P'n below the return strand 56.

Figure 12A:
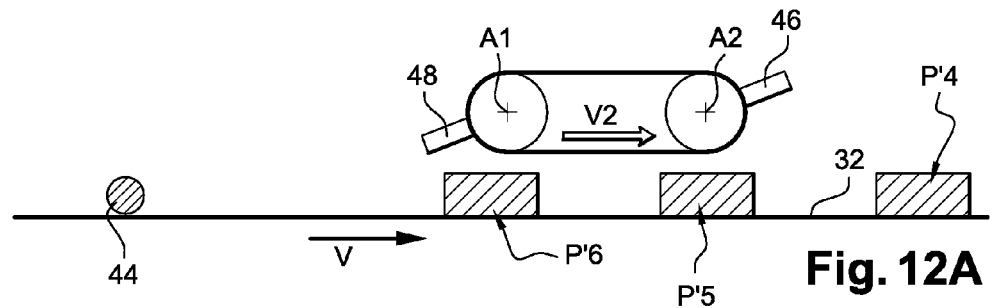
FIGS. 12A and 12B are views, similar to the preceding ones, which represent the second phaser when the driving belt is in the passive state just after the slowed-down proximal product has been released and just before the engagement of a stop with a new proximal product the spacing of which to the downstream product is less than the second pitch.

In FIG. 12A, the two stops 46, 48 occupy inverted positions in relation to FIG. 9A, the second stop 48 occupying an upstream standby position and the first stop 46 occupying a downstream standby position.

Advantageously, the driving belt 50 is successively commanded into a passive state and into an active state.

In its passive state, which is illustrated by FIGS. 9A and 12A, the driving belt 50 is halted and the stops 46, 48 occupy their standby positions.

In the active state of the driving belt 50, which is illustrated by FIGS. 10A and 11A, the servomotor 58 drives the driving belt 50 rotationally around the pulleys 52, 54, which causes a longitudinal displacement of the stops 46, 48 above the belt 12 at a speed called the slowing-down speed V2 which is less than the running speed V of the belt 12.

The slowing-down speed V2 of the second phaser 222 is preferably approximately constant and corresponds to the longitudinal speed VL of displacement of the stops 46, 48.

Considering FIGS. 9A to 12A, the first stop 46 moves downstream from its upstream standby position to its downstream standby position, and the second stop 48 moves upstream from its downstream standby position to its upstream standby position.

In the course of the displacement of the first stop 46 downstream, this occupies engaged positions.

Advantageously, the driving belt 50 is commanded into its active state and into its passive state depending on signals emitted by the previously described detection means 44, such as a sensor or an encoder, which are arranged downstream of the first phaser 122 and as far upstream as possible of the second phaser 222.

The sensor or encoder 44 consists, for example, of an electrical cell arranged over that of the longitudinal edges of the belt 12 which is adjacent the second line F2.

Advantageously, the detection signal from the sensor 44 is first of all exploited to monitor the spacing E between a downstream product Pn from the first line F1, such as the product, and a proximal upstream product P'n from the second line F2, i.e. for determining, for example, the value of the spacing E between the product P7 and the product P'5.

The second slowing-down step is selectively employed as soon as the determined value of the spacing E thus monitored is less than the value of the second pitch PAS2.

Advantageously, the detection signal from the detection means 44 is also exploited in real time for the selective control of the second phaser 222, in particular in order to ensure the synchronous starting of the servomotor 58 at the appropriate moment.

Advantageously, the control of the driving of the driving belt 50 of the phaser 222 is synchronized with the detection of the products P'n from the second line F2 such that the phaser 222 is capable of slowing down the products P'n independently of variations in the value of the spacing E from one sequence to another.

As previously explained, this feature of selective operation is particularly advantageous for enabling reliable operation of the layout 10 according to the invention at a high rate, for example beyond 900 products per minute and more particularly when the feeder belts 14, 16 have different speeds VA1, VA2.

The slowing-down speed V2 of the second phaser 222 is determined, according to the fourth sequence S4 shown, such that while the product P'5 from the second line F2 covers the longitudinal distance, called the slowing-down distance, between the upstream and downstream engaged positions of a stop 46, 48, the products P7 and P'4 of batch L4 situated downstream simultaneously cover, at the running speed V, a sufficient longitudinal distance, when the proximal product P'5 is released, for the value of the initial spacing E to have been increased to reach a value at least equal to the value of the second pitch PAS2.

In the following, the operation of the second phaser 222 will be described in detail, which operation is similar in its principle to that of the first phaser 122 in the case of processing the fourth sequence S4.

When the driving belt 50 is in a passive state where the first stop 46 occupies its upstream standby position (FIG. 9A), the sensor 44 successively detects, upstream of the phaser 222, the arrival of the product P7 from the first line F1, here associated with the product P'4 from the second line F2 to form the batch L4, then that of the proximal product P'5 and hence determines the value of the spacing E between the products P7 and P'5.

According to the fourth sequence S4, the spacing E between the product P7 from the first line F1 and the product P'5 from the second line F2 is less than the value of the second pitch PAS2.

The phaser 222 will therefore slow down the proximal product P'5 situated in the second line F2 immediately upstream of the product P7 and of the product P'4.

Advantageously, the detection signal emitted by the sensor or encoder 44 is exploited to cause, selectively and synchronously, the starting of the servomotor 58 in relation to the movement of the proximal product P'5.

The driving belt 50 thus passes from its passive state to its active state, and the first stop 46 passes from its upstream standby position to its engaged position, as shown in FIGS. 9A and 7A.

The first stop 46 is then driven longitudinally downstream at the slowing-down speed V2.

As the slowing-down speed V2 of the first stop 46 is less than the running speed V of the proximal product P'5, the product P'5 meets the first stop 46 and stops against the upstream transverse side thereof, which causes slipping of said product P'5 on the belt 12.

The proximal product P'5 from then on moves longitudinally at the slowing-down speed V2 imposed by the first stop 46, until the first stop 46 comes to occupy a retracted position in accordance with the second intermediate release step.

Note that, while the driving belt 50 is passing from the passive state to the active state, the starting of the servomotor 58 comprises a prior acceleration phase ph1 which enables the driving belt 50 to shift from a zero longitudinal drive speed VL to a stabilized longitudinal drive speed VL equal to the slowing-down speed V2.

The upstream standby position is preferably chosen in such a way that the first stop 46 reaches an intermediate engagement position at the end of the acceleration phase ph1 before it has reached its first vertical engaged position.

FIG. 9A shows the intermediate engagement position of the first stop 46 in thin broken lines and the first vertical engaged position of the first stop 46 in thick broken lines.

The phase of movement of the first stop 46 between the intermediate engagement position and the first vertical engaged position is called the engagement phase ph2.

The moment the servomotor 58 is started is, for example, set in relation to the signal, here from the sensor 44, such that the proximal product P'5, arriving at the running speed V, comes into contact synchronously with the first stop 46 during the engagement phase ph2.

Thus, when the first stop 46 occupies its first vertical engaged position, the proximal product P'5 is blocked bearing against the first stop 46, which is illustrated by FIG. 10A.

From then on, being blocked bearing against the first stop 46, the proximal product P'5 moves longitudinally at the slowing-down speed V2.

As the products P7 and P'4 situated downstream always move on the belt 12 at the running speed V, the upstream spacing E will progressively increase until reaching a nonzero value corresponding to at least the value of the second pitch PAS2, preferably being equal to the latter.

The tipping of the stop 46 to its retracted position therefore takes place when the spacing E has reached at least the value of the second pitch PAS2.

Figure 12B:
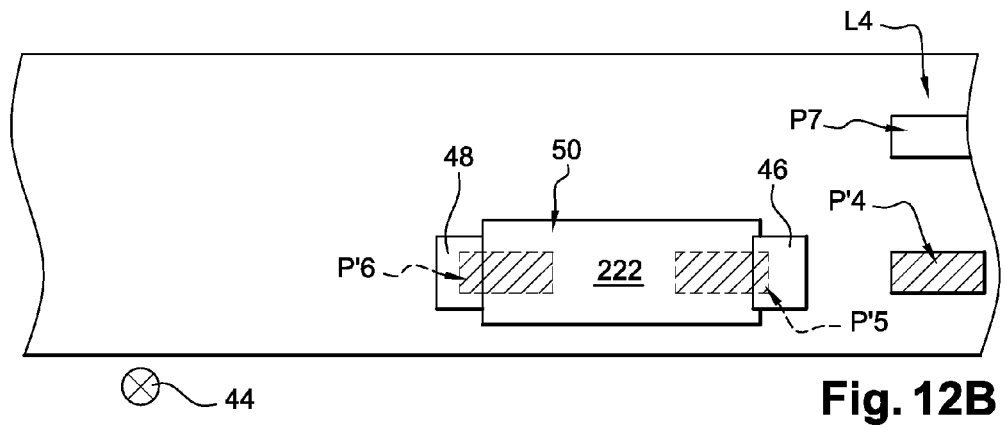

As is shown in FIG. 12B, the proximal product P'5 and the products P7 and P'4 of the batch L4 are, downstream of the second phaser 222, spaced by a value corresponding to at least the second pitch PAS2 such that the collector 24 has the time lapse T2 required to shift two cells Ai, Ai+1 at the same time after having received the batch L4 consisting of the products P7 and P'4 and before the proximal product P'5 in turn enters an empty cell.

On arriving at the height of the downstream pulley 54, the first stop 46 retracts and comes to occupy its downstream standby position, shown in FIG. 12A. The driving belt 50 then passes from its active state to its passive state.

The tipping of the first stop 46 from a final vertical engaged position, which is shown in continuous lines in FIG. 11A, to an intermediate disengagement position, which is shown in thin broken lines in FIG. 11A, is called the disengagement phase ph3.

The proximal product P'5 is then let go by the first stop 46 in the course of the disengagement phase ph3, so as to continue its journey downstream at the running speed V, like the products P7 and P'4 situated downstream.

The end of the disengagement phase ph3 corresponds to the start of a phase called the deceleration phase ph4, in the course of which the longitudinal drive speed VL of the driving belt 50 shifts from the slowing-down speed V2 to a speed of zero, and in the course of which the first stop 46 passes from its intermediate disengagement position to its downstream standby position, which is shown in thick broken lines in FIG. 11A.

The second phaser 222 thus carries out, in accordance with the method according to the invention, the second slowing-down step.

The processing of the sequence S4 that has just been described by way of example corresponds to a complete cycle of the second phaser 222.

As illustrated in FIG. 12A, when the second stop 48 is occupying its upstream standby position, the phaser 222 is then ready to slow down a new proximal product P'n from the second line F2 for which the value of the spacing E relative to the product Pn from the first line F1 situated immediately downstream is less than the value of the second pitch PAS2.

Advantageously, the stop 46, 48 of the second phaser 222 is selectively commanded from its retracted standby position into its engaged position when the value of the spacing E between a downstream product Pn from the first line F1 and the proximal product P'n situated immediately upstream in the second line F2 is less than a second determined set value, called the second pitch PAS2.

In a variant that is not shown, the first phaser 122 and the second phaser 222 are structurally identical to the improved phaser 23 described by the applicant in its French patent application FR 0550528, filed on Feb. 28, 2005 (not published) which may be referred to for greater detail.

Using the layout 10 according to the invention, it is possible to preserve a particularly high running speed V, as the products Pn, P'n from the flow F are only slowed down and not temporarily stopped with a zero longitudinal speed VL as previously, in particular with phasing means with a suction device according to the prior art.

This is the reason for which the invention allows high rates to be attained, for example between 900 and 1100 products per minute, depending on the type of product, namely rates that are far higher than those attained previously with solutions from the prior art.

The invention can be applied to all types of products, but is, however, particularly advantageous for certain types of product, called nonaccumulable products, for example products in sachets that do not have rigid bearing surfaces defining precise points of contact between the products.

In addition, the processing of the products Pn, P'n is carried out without disturbing the transverse position of the products or modifying the orientation of the products.

The invention claimed is:

1. A layout, for implementing a regulation method for aligning a flow (F) of products (Pn, P'n) comprising at least a first line (F1) of products (Pn) and a second line (F2) of products (P'n), parallel to the first line (F1), which are transported longitudinally on a common conveyor belt (12) at a running speed (V) from an upstream arrival area (18) to a downstream output area (20) in order to feed a transfer device (24) for transfer into cells (Ai), the method comprising, with the products of first and second files (F1, F2) being transported on a common conveyor belt (12), performing a first slowing-down step and a second slowing-down step during the transport of the products of the first and second files (F1, F2) on the common conveyor belt (12) while the common conveyor belt (12) is moving, where i) said first slowing-down step which, when the spacing value (E) between a given first product (Pn, P'n) belonging to one of the lines (F1, F2) and a second product (Pn, P'n) situated immediately upstream and belonging to the other of said lines (F1, F2) is less than a first determined set value, called the first pitch (PAS1), consists in slowing down said first product (Pn, P'n) relative to the second product (Pn, P'n) on the belt without changing the running speed (V) of the belt until the spacing (E) between said first product (Pn, P'n) from the line (F1, F2) and the associated second product (Pn, P'n) from the other line (F1, F2) reaches a predetermined, approximately zero, first value for which the first and second products (Pn, P'n) are generally aligned in the transverse direction; ii) said second slowing-down step which, when the spacing value (E) between a downstream product (Pn) from the first line (F1) and the proximal product (P'n) situated immediately upstream in the second line (F2), is less than a second determined set value, called the second pitch (PAS2), consists in slowing down said proximal product (P'n) relative to the product (Pn) situated downstream in the first line (F1) until the spacing (E) between the proximal product (P'n) from the second line (F2) and the product (Pn) from the first line (F1) reaches a predetermined, nonzero value corresponding to at least the second set value (PAS2) of the second pitch, and iii) said first slowing-down step and said second slowing-down step being respectively employed selectively so as to bring into phase the spacing (E) between two consecutive products (Pn) and (P'n) respectively belonging to one or the other of the first and second lines (F1, F2) according to a sequence (PAS1, PAS2) determined according to the cell (Ai) transfer device (24), said layout comprising;

the flow (F) of products (Pn, P'n) consisting of at least the first line (F1) of products (Pn) and the second line (F2) of products (P'n), parallel to the first line (F1), which are transported longitudinally on the common conveyor belt (12) at the running speed (V) from the upstream arrival area (18) to the downstream output area (20), in which the flow (F) of products (Pn, P'n) is intended to feed the transfer device (24) for transfer into the cells (Ai), called the collector, arranged downstream of the output area (20) of the belt (12) so as to present, opposite each of said first and second lines (F1, F2) respectively, an associated empty cell (Ai) intended to contain at least one product (Pn) or (P'n);

between the arrival area (18) and the output area (20) of the belt (12):

first regulation means (122), called the first phaser, which, when the spacing value (E) between a given first product (Pn, P'n) belonging to one of the lines (F1, F2) and a second product (Pn, P'n) situated immediately upstream and belonging to the other of said lines (F1, F2) is less than a first determined set value, called the first pitch (PAS1), are able to selectively slow down said first product (Pn, P'n) relative to the second product (Pn, P'n) on the belt (12) without changing the running speed (V) of the belt (12) until the spacing (E) between said first product (Pn, P'n) from the line (F1, F2) and the associated second product (Pn, P'n) from the other line (F1, F2) reaches a predetermined, approximately zero, first value for which the first and second products (Pn, P'n) are generally aligned in the transverse direction, and second regulation means (222), called the second phaser, arranged downstream of the first regulation means (122) which, when the spacing value (E) between a downstream product (Pn) from the first line (F1) and the proximal product (P'n) situated immediately upstream in the second line (F2) is less than a second determined set value, called the second pitch (PAS2), are able to selectively slow down said proximal product (P'n) relative to the product (Pn) situated downstream in the first line (F1) until the spacing (E) between the proximal product (P'n) and the downstream product (Pn) reaches a predetermined, nonzero value corresponding to at least the second set value (PAS2) of the second pitch, and wherein the first phaser (122) and the second phaser (222) each comprise at least one driving belt (30, 50) which bears at least one stop (26, 28, 46, 48) and which is arranged on the side of the upper face (32) of the belt (12), in that the driving belt (30, 50) is wound over at least two driving pulleys (34, 36, 52, 54) such that a return strand (38, 56) of the driving belt (30, 50) extends approximately parallel to the upper face (32) of the belt (12), the stop (26, 28, 46, 48) occupying engaged positions when it is situated on the return strand (38, 56), and in that the phaser (122, 222) comprises means (40, 58) capable of rotationally driving the pulleys (34, 36, 52, 54) such that the longitudinal driving speed (VL) of the stop (26, 28, 46, 48) by the driving belt (30, 50) is equal to the slowing-down speed (V1) for the first phaser (122) and to the slowing-down speed (V2) for the second phaser (222) respectively.

2. The layout (10) as claimed in claim 1, characterized in that the driving belt (30) of the first phaser (122) has a passive operating state in which it is halted, with each stop (26, 28) occupying a retracted standby position, and an active operating state in which the driving belt (30) is rotationally driven around the pulleys (34, 36) such that a stop (26, 28) moves longitudinally downstream in the engaged position, and in that the driving belt (30) is commanded into its active state when at least one sensor (42, 43), arranged upstream of the first phaser (122), detects a second product (Pn, P'n) belonging to one of the lines (F1, F2) with a spacing value (E) relative to a given first product (Pn, P'n) situated immediately downstream and belonging to the other of said lines (F1, F2) is less than the first determined set value, called the first pitch (PAS1).

3. The layout (10) as claimed in claim 2, characterized in that the stop (26, 28) of the first phaser (122) is selectively commanded from its retracted standby position to its engaged position when the value of the spacing (E) between a given first product (Pn, P'n) belonging to one of the lines (F1, F2) and a second product (Pn, P'n) situated immediately upstream and belonging to the other of said lines (F1, F2) is less than a first determined set value, called the first pitch (PAS1).

4. The layout (10) as claimed in claim 3, characterized in that the driving belt (50) of the second phaser (222) has a passive operating state in which it is halted, with each stop (46, 48) occupying a retracted standby position, and an active operating state in which the driving belt (50) is rotationally driven around the pulleys (52, 54) such that a stop (46, 48) moves longitudinally downstream in the engaged position, and in that the driving belt (50) is commanded into its active state when at least one sensor (44), arranged upstream of the second phaser (222), detects in the second line (F2) a proximal product (P'n) with a spacing value (E) relative to the product (Pn) from the first line (F1) situated immediately downstream less than the second determined set value, called the second pitch (PAS2).

5. The layout (10) as claimed in claim 4, characterized in that the stop (46, 48) of the second phaser (222) is selectively commanded from its retracted standby position to its engaged position when the value of the spacing (E) between a downstream product (Pn) from the first line (F1) and the proximal product (P'n) situated immediately upstream in the second line (F2) is less than a second determined set value, called the second pitch (PAS2).

6. A method, for implementing a regulation method for aligning a flow (F) of products (Pn, P'n) comprising at least a first line (F1) of products (Pn) and a second line (F2) of products (P'n), parallel to the first line (F1), which are transported longitudinally on a common conveyor belt (12) at a running speed (V) from an upstream arrival area (18) to a downstream output area (20) in order to feed a transfer device (24) for transfer into cells (Ai), the method comprising, with the products of first and second files (F1, F2) being transported on a common conveyor belt (12), performing a first slowing-down step and a second slowing-down step during the transport of the products of the first and second files (F1, F2) on the common conveyor belt (12) while the common conveyor belt (12) is moving, where i) said first slowing-down step which, when the spacing value (E) between a given first product (Pn, P'n) belonging to one of the lines (F1, F2) and a second product (Pn, P'n) situated immediately upstream and belonging to the other of said lines (F1, F2) is less than a first determined set value, called the first pitch (PAS1), consists in slowing down said first product (Pn, P'n) relative to the second product (Pn, P'n) on the belt without changing the running speed (V) of the belt until the spacing (E) between said first product (Pn, P'n) from the line (F1, F2) and the associated second product (Pn, P'n) from the other line (F1, F2) reaches a predetermined, approximately zero, first value for which the first and second products (Pn, P'n) are generally aligned in the transverse direction; ii) said second slowing-down step which, when the spacing value (E) between a downstream product (Pn) from the first line (F1) and the proximal product (P'n) situated immediately upstream in the second line (F2), is less than a second determined set value, called the second pitch (PAS2), consists in slowing down said proximal product (P'n) relative to the product (Pn) situated downstream in the first line (F1) until the spacing (E) between the proximal product (P'n) from the second line (F2) and the product (Pn) from the first line (F1) reaches a predetermined, nonzero value corresponding to at least the second set value (PAS2) of the second pitch, and iii) said first slowing-down step and said second slowing-down step being respectively employed selectively so as to bring into phase the spacing (E) between two consecutive products (Pn) and (P'n) respectively belonging to one or the other of the first and second lines (F1, F2) according to a sequence (PAS1, PAS2) determined according to the cell (Ai) transfer device (24), said layout comprising:

the flow (F) of products (Pn, P'n) consisting of at least the first line (F1) of products (Pn) and the second line (F2) of products (P'n), parallel to the first line (F1), which are transported longitudinally on the common conveyor belt (12) at the running speed (V) from the upstream arrival area (18) to the downstream output area (20), in which the flow (F) of products (Pn, P'n) is intended to feed the transfer device (24) for transfer into the cells (Ai), called the collector, arranged downstream of the output area (20) of the belt (12) so as to present, opposite each of said first and second lines (F1, F2) respectively, an associated empty cell (Ai) intended to contain at least one product (Pn) or (P'n);

between the arrival area (18) and the output area (20) of the belt (12):

first regulation means (122), called the first phaser, which, when the spacing value (E) between a given first product (Pn, P'n) belonging to one of the lines (F1, F2) and a second product (Pn, P'n) situated immediately upstream and belonging to the other of said lines (F1, F2) is less than a first determined set value, called the first pitch (PAS1), are able to selectively slow down said first product (Pn, P'n) relative to the second product (Pn, P'n) on the belt (12) without changing the running speed (V) of the belt (12) until the spacing (E) between said first product (Pn, P'n) from the line (F1, F2) and the associated second product (Pn, P'n) from the other line (F1, F2) reaches a predetermined, approximately zero, first value for which the first and second products (Pn, P'n) are generally aligned in the transverse direction, and second regulation means (222), called the second phaser, arranged downstream of the first regulation means (122) which, when the spacing value (E) between a downstream product (Pn) from the first line (F1) and the proximal product (P'n) situated immediately upstream in the second line (F2) is less than a second determined set value, called the second pitch (PAS2), are able to selectively slow down said proximal product (P'n) relative to the product (Pn) situated downstream in the first line (F1) until the spacing (E) between the proximal product (P'n) and the downstream product (Pn) reaches a predetermined, nonzero value corresponding to at least the second set value (PAS2) of the second pitch, wherein the first phaser (122) comprises at least one retractable stop (26, 28) which is successively controlled between:
- at least one engaged position in which the stop (26, 28) intervenes, by contact, in front of a given first product (Pn, P'n) from one of the lines (F1, F2) with a view to slowing it down until it is met by a second product (Pn, P'n) situated immediately upstream in the other of the lines (F1, F2) so that the spacing value (E), which is initially less than the first determined set value, called the first pitch (PAS1), reaches a predetermined, approximately zero, first value for which said first and second products (Pn, P'n) are generally aligned in the transverse direction, and
- at least one retracted position which makes it possible to allow said first and second products (Pn, P'n), aligned next to one another, to continue their movement downstream at the running speed (V), and wherein the first phaser (122) and the second phaser (222) each comprise at least one driving belt (30, 50) which bears at least one stop (26, 28, 46, 48) and which is arranged on the side of the upper face (32) of the belt (12), in that the driving belt (30, 50) is wound over at least two driving pulleys (34, 36, 52, 54) such that a return strand (38, 56) of the driving belt (30, 50) extends approximately parallel to the upper face (32) of the belt (12), the stop (26, 28, 46, 48) occupying engaged positions when it is situated on the return strand (38, 56), and in that the phaser (122, 222) comprises means (40, 58) capable of rotationally driving the pulleys (34, 36, 52, 54) such that the longitudinal driving speed (VL) of the stop (26, 28, 46, 48) by the driving belt (30, 50) is equal to the slowing-down speed (V1) for the first phaser (122) and to the slowing-down speed (V2) for the second phaser (222) respectively.

* * * * *